United States Patent
Takayanagi

(10) Patent No.: US 12,363,461 B2
(45) Date of Patent: Jul. 15, 2025

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventor: Isao Takayanagi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 142 days.

(21) Appl. No.: 18/466,486

(22) Filed: Sep. 13, 2023

(65) Prior Publication Data
US 2024/0089635 A1   Mar. 14, 2024

(51) Int. Cl.
*H04N 25/771*   (2023.01)
*H04N 25/60*   (2023.01)

(52) U.S. Cl.
CPC ........... *H04N 25/771* (2023.01); *H04N 25/60* (2023.01)

(58) Field of Classification Search
CPC ........ H04N 25/65; H04N 25/60; H04N 25/78; H04N 25/616; H04N 25/771; H04N 25/68; H04N 25/67
See application file for complete search history.

(56) References Cited

U.S. PATENT DOCUMENTS

| | | |
|---|---|---|
| 6,697,111 B1 | 2/2004 | Kozlowski et al. |
| 2005/0040485 A1 | 2/2005 | Kawahito |
| 2005/0199813 A1 | 9/2005 | Van Bogget |
| 2020/0228740 A1* | 7/2020 | Otaka ................. H04N 25/78 |
| 2022/0070397 A1* | 3/2022 | Tokunaga ............. H03K 3/011 |
| 2023/0111897 A1* | 4/2023 | Azuhata ................. H04N 25/79 348/301 |
| 2023/0216459 A1* | 7/2023 | Kobayashi ........... H03M 3/456 348/300 |

FOREIGN PATENT DOCUMENTS

| | | |
|---|---|---|
| JP | 2002-501718 A | 1/2002 |
| JP | 2005-065074 A | 3/2005 |
| JP | 2006-505975 A | 2/2006 |

OTHER PUBLICATIONS

Aoki et al., "A Rolling-Shutter Distortion-Free 3D Stacked Image Sensor with—160dB Parasitic Light Sensitivity In-Pixel Storage Node", IEEE International Solid-State Circuits Conference, Session 27, Image Sensors, 27.3, Feb. 22, 2013, pp. 1-3.

* cited by examiner

*Primary Examiner* — Kelly L Jerabek
(74) *Attorney, Agent, or Firm* — Pillsbury Winthrop Shaw Pittman LLP

(57) ABSTRACT

Provided are a solid-state imaging device, a method for driving a solid-state imaging device and an electronic apparatus that are capable of achieving reduced noise at a voltage sample-and-hold node without requiring an increase in capacitance of a signal holding capacitor for sampling and holding voltage. A solid-state imaging device includes: a photoelectric conversion reading part; an amplifier circuit; a signal holding part including a sample-and-hold signal holding capacitor for holding the read-out voltage signal amplified by the amplifier circuit and outputting the held voltage signal; a first in-pixel signal line to which a low-gain read-out voltage signal is output; and a second in-pixel signal line connected to the output side of the amplifier circuit and to which a high-gain read-out voltage signal is output. A second differential transistor of a differential transistor pair of the amplifier circuit also serves as a source follower transistor.

20 Claims, 18 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2022-145304 (filed on Sep. 13, 2022), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

The CMOS image sensor may sequentially scan the pixels or rows one-by-one to read the charges generated by photoelectric conversion and stored in the photodiodes. When such sequential scan is employed, in other words, a rolling shutter is employed as the electronic shutter, it is not possible to start and end the exposure for storing the charges produced by photoelectric conversion at the same time in all of the pixels. Therefore, if the sequential scan is employed to image a moving object, the captured image may disadvantageously experience distortion.

Some applications, for example, image capturing of fast moving objects or sensing, which requires simultaneity among the captured images, do not tolerate image distortion. Thus, a global shutter is employed as the electronic shutter. When the global shutter is employed, the exposure can be started and ended at the same timing in all of the pixels of the pixel array part.

In CMOS image sensors employing global shutter as the electronic shutter, the pixels have therein a signal holding part for holding, in a sample-and-hold capacitor, a signal that is read out from a photoelectric conversion reading part, for example. The CMOS image sensors employing global shutter sample and hold in an analog manner and stores the charges from the photodiodes in the signal hold capacitors of the signal holding parts at the same time in the form of voltage signals and subsequently sequentially read the voltage signals. In this way, the simultaneity is reliably achieved among the images (see, for example, J. Aoki, et al., "A Rolling-Shutter Distortion-Free 3D Stacked Image Sensor with −160 dB Parasitic Light Sensitivity In-Pixel Storage Node" ISSCC 2013/SESSION 27/IMAGE SENSORS/27.3). The CMOS image sensors of this type may be provided with a bypass switch to enable the output from the photoelectric conversion reading part to bypass the signal holding part and to be transferred to a signal line, thereby having the rolling shutter function in addition to the global shutter function.

Each pixel is configured as, for example, a 4-transistor (4Tr) APS pixel (see, for example, Japanese Patent Application Publication No. 2005-65074 FIG. 2), or a capacitive trans-impedance amplifier (CTIA) pixel (see, for example, Japanese Patent Application Publication (Translation of PCT Application) No. 2006-505975 and Japanese Patent Application Publication (Translation of PCT Application) No. 2002-501718).

CMOS image sensors having a high dynamic range and high image quality include pixels with a global shutter function, which are typified by voltage mode global shutter (VMGS) pixels and charge mode global shutter (CMGS) pixels.

The VMGS pixels advantageously have higher shutter efficiency and lower sensitivity to parasitic light than the CMGS pixels.

The sensitivity of the 4TrAPS pixels described above can be enhanced by raising the conversion gain. The sensitivity of the 4TrAPS pixels can be enhanced to some extent by lowering the floating diffusion FD capacitance Cfd1. However, too high gain results in lower effective full well. Accordingly, the 4TrAPS pixels may be incapable of capturing the details of high-luminance subjects. The 4TrAPS pixels may be capable of capturing the details of high-luminance subjects by increasing the capacitance Cfd1 of the floating diffusion FD. The increase in the capacitance Cfd1, however, may lead to absence of details of low-luminance subjects.

In addition, the difference in potential between the photodiode PD1 and the floating diffusion FD drops eminently, thereby causing lags and compromising the image quality of videos. Furthermore, as the conversion gain increases, the voltage fluctuation, which results from the clock feed-through and other factors experienced at the resetting of the pixels, increases. The increased voltage fluctuation narrows the voltage amplitude range, thereby further lowering the effective full well. For the reasons stated above, the conventionally known pixel configurations have to make a trade-off between high sensitivity and high dynamic range.

The CTIA pixels described above can achieve enhanced sensitivity in such a manner that the capacitance Cfb1 of the feedback capacitor CF is set smaller than the capacitance Cfd1 of the floating diffusion FD of the 4TrAPS pixels. As a result, the CTIA pixels can capture bright images of low-luminance subjects. The full well, however, drops as the sensitivity increases. The CTIA pixels therefore encounter more significant absence of details of high-luminance subjects.

CMOS image sensors with VMGS pixels may disadvantageously have more significant floor noise than CMOS image sensors with CMGS pixels.

In the VMGS pixels, the noise mainly originates from the thermal noise caused by the sampling and holding of the voltage, and the noise voltage Vn can be expressed by the following expression.

$$Vn = \text{SQRT}(kT/C_{SH}) \qquad \text{[Expression 1]}$$

In the expression, T, k, and $C_{SH}$ respectively denote the absolute temperature, Boltzmann's constant, and capacitance value of the sample-and-hold capacitance element, and SQRT means the square root.

The voltage signal Vs is represented by the following expression using the electron-to-voltage conversion gain CG.

$$Vs = N\,sig(e) \times CG(V/e)$$

The electron reference noise Nn is thus expressed as follows.

$$Nn(e) = 1/CG \times SQRT(kT/C_{SH})$$

This expression means that the electron reference noise Nn can be reduced by increasing the electron-to-voltage conversion gain CG or the capacitance value $C_{SH}$ of the voltage sample-and-hold capacitor.

Increasing the capacitance value $C_{SH}$ face physical constraints due to the pixel size. In addition, an increase in the electron-to-voltage conversion gain CG usually leads to a decrease in the dynamic range DR. To address these issues, it has been proposed to allow pixels to have a plurality of conversion gains CG in order to increase the dynamic range DR. As having the high conversion gain CG, however, the VMGS pixels, are still inferior to the CMGS pixels in terms of the floor noise.

One of the key performance indices of the CMOS image sensor is random noise. It is generally known that the random noise can be reduced in the following manners. The transistor size may be increased to reduce the flicker noise, or a capacitor may be added to the output of the operational amplifier to lower the band so that the CDS can effectively serve as a noise filter. Due to the increased area and capacitance, however, these techniques experience worse inversion delay in the operational amplifier. This disadvantageously encounter difficulties in raising the frame rate of the imaging element.

SUMMARY

An object of the present invention is to provide a solid-state imaging device, a method for driving a solid-state imaging device and an electronic apparatus that are capable of achieving reduced noise at a voltage sample-and-hold node without requiring an increase in capacitance of a signal holding capacitor for sampling and holding voltage, thereby achieving a high pixel gain in a high gain mode while keeping a low gain for a high-luminance optical signal, accomplishing low conversion gain read-out in a low gain mode, and substantially realizing enhanced dynamic range and increased frame rate.

A first aspect of the present invention provides a solid-state imaging device including a pixel part having a plurality of pixels arranged therein. Each of the pixels includes: a photoelectric conversion reading part for storing charges produced by photoelectric conversion and producing a readable voltage signal at a level determined by an amount of the stored charges; an amplifier circuit for amplifying a read-out voltage signal read from the photoelectric conversion reading part; a signal holding part including a sample-and-hold signal holding capacitor for holding the read-out voltage signal amplified by the amplifier circuit and outputting the held voltage signal; a first in-pixel signal line to which a low-gain read-out voltage signal is output; and a second in-pixel signal line connected to an output side of the amplifier circuit and to which a high-gain read-out voltage signal is output. The photoelectric conversion reading part includes: a photoelectric conversion element for storing therein, in an integration period, charges generated by photoelectric conversion; a transfer element for transferring, in a transfer period, the charges stored in the photoelectric conversion element; an output node to which the charges stored in the photoelectric conversion element are transferred through the transfer element; a source follower transistor for converting the charges in the output node into a voltage signal at a level corresponding to an amount of the charges; a reset element for resetting, in a reset period, the output node to a predetermined potential or to a potential of the second in-pixel signal line; and a feedback capacitor having electrodes one of which is connected to the output node and the other of which is connected to the second in-pixel signal line. The first in-pixel signal line is connected to an output line to which the voltage signal is output from the source follower transistor; and connected to an input side of the amplifier circuit. The amplifier circuit includes a differential transistor pair constituted by first and second differential transistors with a reference signal being fed to a gate of the first differential transistor, the differential transistor pair being configured to perform differential amplification, and the second differential transistor of the differential transistor pair also serves as the source follower transistor.

A second aspect of the present invention provides a method for driving a solid-state imaging device, The solid-state imaging device includes a pixel part having a plurality of pixels arranged therein. Each of the pixels includes: a photoelectric conversion reading part for storing charges produced by photoelectric conversion and producing a readable voltage signal at a level determined by an amount of the stored charges; an amplifier circuit for amplifying a read-out voltage signal read from the photoelectric conversion reading part; a signal holding part including a sample-and-hold signal holding capacitor for holding the read-out voltage signal amplified by the amplifier circuit and outputting the held voltage signal; a first in-pixel signal line to which a low-gain read-out voltage signal is output; and a second in-pixel signal line connected to an output side of the amplifier circuit and to which a high-gain read-out voltage signal is output. The photoelectric conversion reading part includes: a photoelectric conversion element for storing therein, in an integration period, charges generated by photoelectric conversion; a transfer element for transferring, in a transfer period, the charges stored in the photoelectric conversion element; an output node to which the charges stored in the photoelectric conversion element are transferred through the transfer element; a source follower transistor for converting the charges in the output node into a voltage signal at a level corresponding to an amount of the charges; a reset element for resetting, in a reset period, the output node to a predetermined potential or to a potential of the second in-pixel signal line; and a feedback capacitor having electrodes one of which is connected to the output node and the other of which is connected to the second in-pixel signal line. The first in-pixel signal line is connected to an output line to which the voltage signal is output from the source follower transistor; and connected to an input side of the amplifier circuit. The amplifier circuit includes: a differential transistor pair constituted by first and second differential transistors with a reference signal being fed to a gate of the first differential transistor, the differential transistor pair being configured to perform differential amplification; and an active load circuit constituted by a first load circuit connected to a drain side of the first differential transistor and a second load circuit connected to a drain side of the second differential transistor, the first and second load circuits being connected to form a current mirror providing a current channel from the drain side of the first differential transistor to the drain side of the second differential transistor. The second differential transistor of the differential transistor pair also serves as the source follower transistor. In a low-gain read-out mode, the first load circuit is deactivated to form a low-gain read-out circuit by the second load circuit and the source follower transistor, and a read-out voltage signal amplified with a low gain is through source follower amplification by the source follower transistor is output to the first in-pixel signal line, and, in a high-gain read-out mode, the first load circuit is activated to form a high-gain read-out circuit by a capacitive trans-impedance amplifier (CTIA) circuit including the feedback capacitor and the differential transistor pair of the amplifier circuit, and a miller effect produced by the capacitive trans-impedance amplifier (CTIA) circuit including the feedback capacitor and the differential transistor pair of the amplifier circuit is used to transfer charges to the feedback capacitor and a voltage signal amplified with a high gain is output to the second in-pixel signal line.

A third aspect of the present invention provides an electronic apparatus including a solid-state imaging device; and an optical system for forming a subject image on the solid-state imaging device. The solid-state imaging device includes a pixel part having a plurality of pixels arranged therein. Each of the pixels includes: a photoelectric conversion reading part for storing charges produced by photoelectric conversion and producing a readable voltage signal at a level determined by an amount of the stored charges; an amplifier circuit for amplifying a read-out voltage signal read from the photoelectric conversion reading part; a signal holding part including a sample-and-hold signal holding capacitor for holding the read-out voltage signal amplified by the amplifier circuit and outputting the held voltage signal; a first in-pixel signal line to which a low-gain read-out voltage signal is output; and a second in-pixel signal line connected to an output side of the amplifier circuit and to which a high-gain read-out voltage signal is output. The photoelectric conversion reading part includes: a photoelectric conversion element for storing therein, in an integration period, charges generated by photoelectric conversion; a transfer element for transferring, in a transfer period, the charges stored in the photoelectric conversion element; an output node to which the charges stored in the photoelectric conversion element are transferred through the transfer element; a source follower transistor for converting the charges in the output node into a voltage signal at a level corresponding to an amount of the charges; a reset element for resetting, in a reset period, the output node to a predetermined potential or to a potential of the second in-pixel signal line; and a feedback capacitor having electrodes one of which is connected to the output node and the other of which is connected to the second in-pixel signal line. The first in-pixel signal line is connected to an output line to which the voltage signal is output from the source follower transistor; and connected to an input side of the amplifier circuit. The amplifier circuit includes a differential transistor pair constituted by first and second differential transistors with a reference signal being fed to a gate of the first differential transistor, the differential transistor pair being configured to perform differential amplification, and the second differential transistor of the differential transistor pair also serves as the source follower transistor.

Advantageous Effects

The present invention can achieve reduced noise at a voltage sample-and-hold node without requiring an increase in capacitance of a signal holding capacitor for sampling and holding voltage, thereby achieving a high pixel gain in a high gain mode while keeping a low gain for a high-luminance optical signal, accomplishing low conversion gain read-out in a low gain mode, and substantially realizing enhanced dynamic range and increased frame rate.

DESCRIPTION OF THE PREFERRED EMBODIMENTS

Embodiments of the present invention will be hereinafter described with reference to the drawings.

First Embodiment

Figure 1:
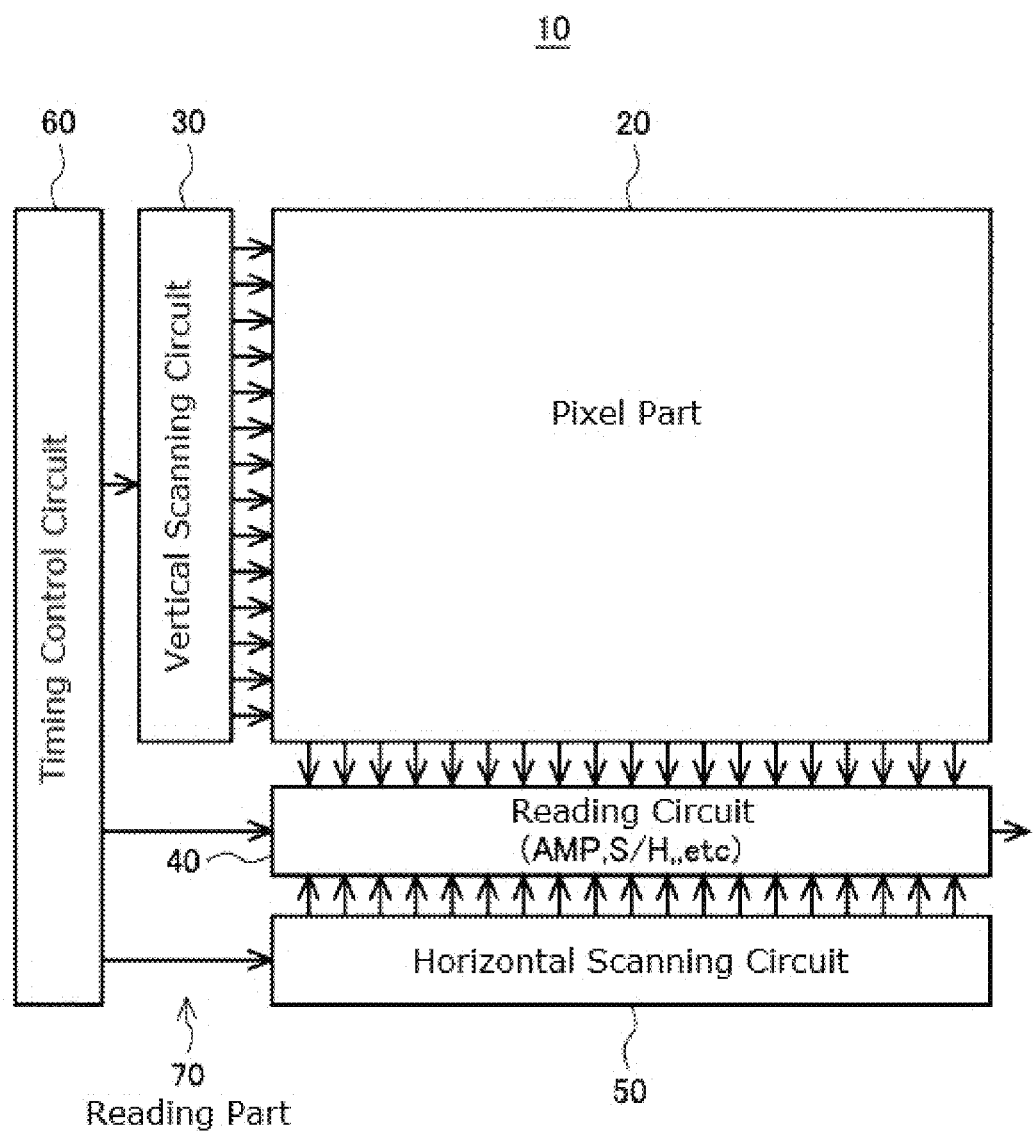
FIG. 1 is a block diagram showing an example configuration of a solid-state imaging device according to a first embodiment of the present invention.

FIG. 1 is a block diagram showing an example configuration of a solid-state imaging device relating to a first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the column reading circuit 40, and the timing control circuit 60 constitute a reading part 70 for reading pixel signals.

In the first embodiment, the solid-state imaging device 10 includes VMGS pixels as will be described in detail below. Each VMCS pixel includes a photoelectric conversion reading part, an amplifier circuit, a signal holding part, a first in-pixel signal line and a second in-pixel signal line. The photoelectric conversion reading part is configured to store electric charges resulting from photoelectric conversion and produce a readable voltage signal at a level determined by the amount of stored charges. The amplifier circuit is configured to amplify the voltage signal read from the photoelectric conversion reading part. The signal holding part included a sample-and-hold signal holding capacitor for holding the read-out voltage signal amplified by the amplifier circuit and outputting the held voltage signal. A low-gain read-out voltage signal is output to the first in-pixel signal line. The second in-pixel signal line is connected to the output side of the amplifier circuit, and a high-gain read-out voltage signal is output to the second in-pixel signal line.

The photoelectric conversion reading part includes: a photoelectric conversion element (photodiode, PD) for storing the charges generated by photoelectric conversion in an integration period; a transfer transistor serving as a transfer element for transferring the charges stored in the photoelectric conversion element in a transfer period; an output node (floating diffusion, FD) to which the charges stored in the photoelectric conversion element are transferred through the transfer transistor; a source follower transistor for converting the charges in the output node into a voltage signal having a level determined by the amount of charges, a reset transistor serving as a reset element for resetting in a reset period the floating diffusion to the potential of the second in-pixel signal line or to a predetermined potential, and a feedback capacitor having electrodes one of which is connected to the floating diffusion FD and the other of which is connected to the second in-pixel signal line. The first in-pixel signal line is connected to the output line of the voltage signal from the source follower transistor and to the input side of the amplifier circuit.

In the first embodiment, the amplifier circuit includes first and second differential transistors with a reference signal VOF being fed to the gate of the first differential transistor. The first and second different transistors constitute a differential transistor pair capable of performing differential amplification. The amplifier circuit further includes an active load circuit constituted by a first load circuit connected to the drain side of the first differential transistor and a second load circuit connected to the drain side of the second differential transistor. The first and second load circuits are connected to form a current mirror providing a current channel from the drain side of the first differential transistor to the drain side of the second differential transistor. The second differential transistor of the differential transistor pair of the amplifier circuit also serves as the source follower transistor. To be specific, in the amplifier circuit, the source of the first differential transistor is connected to the source of the source follower transistor via, for example, the first in-pixel signal line, to form the differential transistor pair.

In the first embodiment, in a low-gain read-out mode MLG, a reading circuit forming part deactivates the first load circuit, so that a low-gain read-out circuit is formed by the second load circuit and the source follower transistor. In the formed low-gain read-out circuit, the source follower transistor performs source follower amplification to amplify the voltage signal with a low gain, and the voltage signal is output to the first in-pixel signal line. In a high-gain read-out mode MHG, the reading circuit forming part activates the first load circuit, so that a high-gain read-out circuit is formed by a capacitive trans-impedance amplifier (CTIA) circuit including the feedback capacitor and the differential transistor pair of the amplifier circuit. In the formed high-gain read-out circuit, the capacitive trans-impedance amplifier (CTIA) circuit including the feedback capacitor and the differential transistor pair of the amplifier circuit produces the miller effect. As a result, the charges are transferred to the feedback capacitor, and the voltage signal amplified with a high gain is output to the second in-pixel signal line.

The solid-state imaging device 10 relating to the first embodiment is capable of achieving reduced noise at a voltage sample-and-hold node without requiring an increase in capacitance of a signal holding capacitor for sampling and holding voltage, thereby achieving a high pixel gain in a high gain mode while keeping a low gain for a high-luminance optical signal, accomplishing low conversion gain read-out in a low gain mode, and substantially realizing enhanced dynamic range and increased frame rate.

The following outlines the configurations and functions of the parts of the solid-state imaging device 10. In particular, the configurations and functions of the VMGS pixels (hereinafter, may be referred to simply as the pixels) in the pixel part 20 and the relating read-out operation will be described in detail, and other features will be also described in detail.

Figure 2:
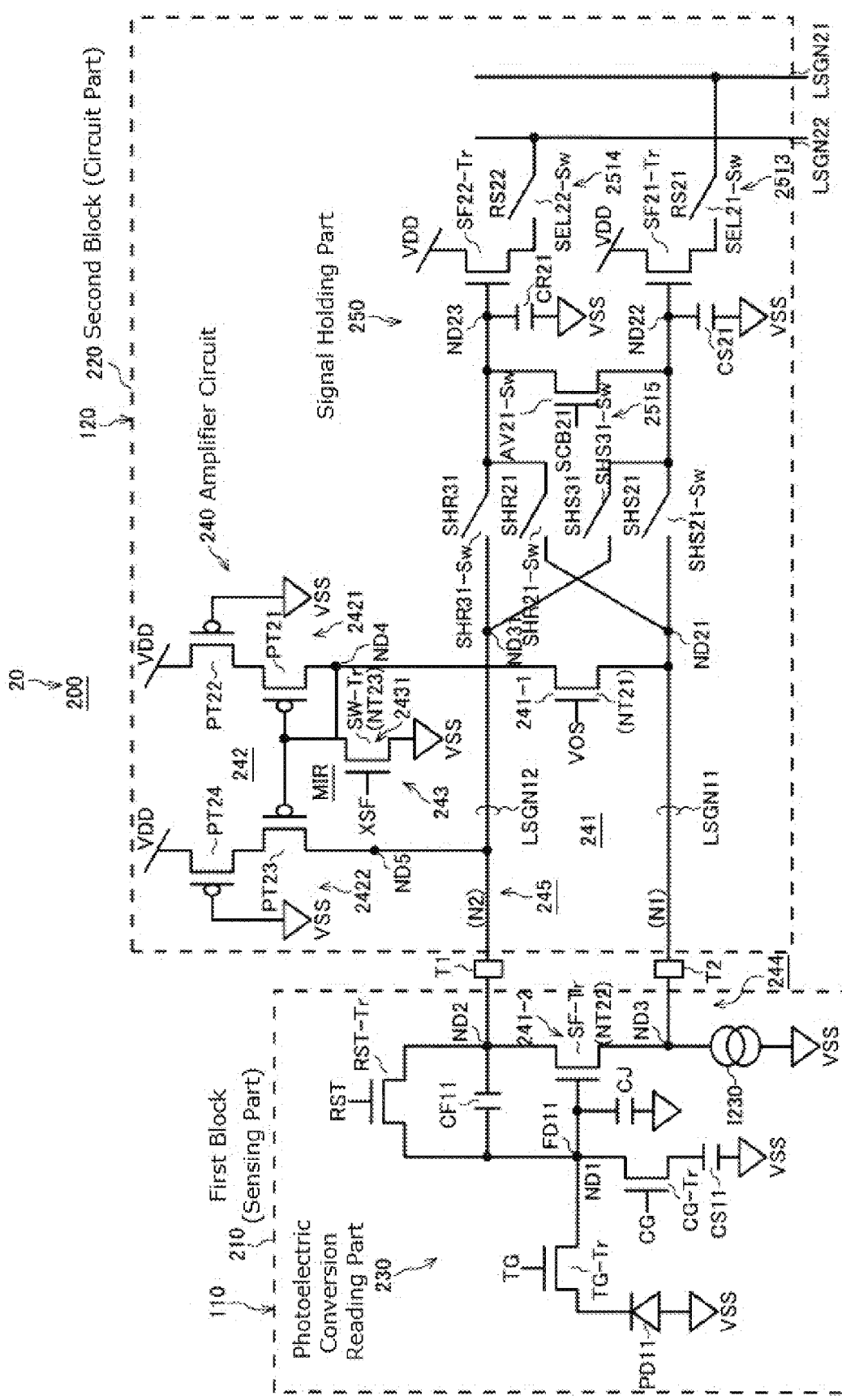
FIG. 2 is a circuit diagram showing an example of pixels according to the first embodiment.

FIG. 2 is a circuit diagram showing an example of the pixels according to the first embodiment of the present invention.

In the first embodiment, the pixel part 20 has pixels 200 arranged therein. Each pixel 200 is divided into a first block or a sensing part 210 and a second block or a circuit part 220. For example, when it comes to the pixel-wise stacking process, the first block or sensing part 210 and the second block or circuit part 220 of the first embodiment are implemented in different wafers. The pixel 200 relating to the first embodiment may have a stacked structure where the first block or sensing part 210 may be formed in a first substrate 110, while the second block or circuit part 220 may be formed in a second substrate 120.

In the above-described stacked structure, the sensing part 210 in the first substrate 110 is electrically connected to the circuit part 220 in the second substrate 120 through vias (die-to-die vias), microbumps, or the like.

In the first embodiment, the pixel 200 is mainly constituted by a photoelectric conversion reading part 230, an amplifier circuit 240, a signal holding part 250, a first in-pixel signal line LSGN11, a second in-pixel signal line LSGN12, a first vertical signal line LSGN21, and a second vertical signal line LSGN22. In the pixel 200 in the pixel part 20, the photoelectric conversion reading part 230 and part of the amplifier circuit 240 are formed in the first block or sensing part 210, and the large part of the amplifier circuit 240 and signal holding part 250 are formed in the second block or circuit part 220.

The photoelectric conversion reading part 230 of the pixel 200 includes, for example, a photodiode PD11 serving as a photoelectric conversion element. For the photodiode PD11, one transfer transistor TG-Tr serving as a transferring element, one reset transistor RST-Tr serving as a resetting element, one source follower transistor SF-Tr serving as a source follower element, one storage transistor CG-Tr serving as a storage element, one floating diffusion FD11 serving as an output node, one feedback capacitor CF11 and one storage capacitor CS11 are provided. The floating diffusion FD11 serving as the output node ND1 has a parasitic capacitance CJ.

The photodiode (PD) in each pixel 200 is a pinned photodiode (PPD). The substrate surface for forming the photodiode (PD) has a surface level due to dangling bonds or other defects. Therefore, a lot of charges (dark current) are generated due to heat energy, as a result of which the signals fail to be read out correctly. The pinned photodiode (PPD) has the charge storage part buried in the substrate, thereby reducing mixing of the dark current into signals.

The pixel 200 relating to the first embodiment includes the storage transistor CG-Tr connected to the floating diffusion FD11 serving as the output node ND1, and the storage capacitor CS11 configured to store at least the charges of the floating diffusion FD11 serving as the output node ND1 via the storage transistor CG-Tr, in order to provide for a plurality of conversion gains (in the present embodiment, high and low gains) and achieve increased dynamic range. In the first embodiment, the storage transistor CG-Tr and storage capacitor CS11 are connected in series between the floating diffusion FD11 serving as the output node ND1 and the reference potential VSS.

Since a circuit including the storage transistor CG-Tr and storage capacitor CS11 connected in series is arranged between the floating diffusion FD11 and the reference potential VSS, a plurality of different gains (at least high and low gains) can be realized. In this way, further improved dynamic range can be achieved.

The photoelectric conversion reading part 230 relating to the first embodiment is connected to the first and second in-pixel signal lines LSGN11 and LSGN12. In the low-gain read-out mode MLG, the photoelectric conversion reading part 230 outputs a low-gain read-out voltage (signal voltage) N1 (VRST1, VSIG1) to the first in-pixel signal line LSGN11. In the high-gain read-out mode MHG, the photoelectric conversion reading part 230 outputs a high-gain read-out voltage (signal voltage) N2 (VRST2, VSIG2) to the second in-pixel signal line LSGN12.

In the first embodiment, the first in-pixel signal line LSGN11 is driven by a constant current source 1230 connected to the source side of the source follower transistor SF-Tr, and the second in-pixel signal line LSGN12 is driven by the amplifier circuit (amplifier) 240 in the circuit part 220.

The photoelectric conversion reading part 230 relating to the first embodiment has a combination of the feedback portion of the CTIA (capacitive trans-impedance amplifier) circuit and the source follower amplifier.

The photodiode PD11 generates signal charges (electrons) in an amount determined by the amount of the incident light and stores the same. Description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes share the transistors or the case where the pixel includes a selection transistor.

In the photoelectric conversion reading part 230, the transfer transistor TG-Tr is connected between the photodiode PD11 and the floating diffusion FD11 and controlled by a control signal TG applied to the gate thereof through a control line. The transfer transistor TG-Tr remains selected and in the conduction state during a transfer period in which the control signal TG is at the high (H) level, to transfer to the floating diffusion FD11 serving as the output node ND1 the charges (electrons) produced by the photoelectric conversion and then stored in the photodiode PD11.

The reset transistor RST-Tr is connected between the second in-pixel signal line LSGN12 and the floating diffusion FD11 and controlled by a control signal RST applied to the gate thereof through a control line. The reset transistor RST-Tr remains selected and in the conduction state during a reset period in which the control signal RST is at the H level, to reset the floating diffusion FD11 to the potential of the second in-pixel signal line LSGN12. The potential VREF and other characteristics of the second in-pixel signal line LSGN12 will be described in detail below.

In the photoelectric conversion reading part 230, the reset transistor RST-Tr, one of the electrodes of the feedback capacitor CF11, and the drain of the source follower transistor SF-Tr are connected, and their connection node ND2 is connected via an inter-block connection terminal T1 to the second in-pixel signal line LSGN12, to which the output side of the amplifier circuit 240 is connected.

The source follower transistor SF-Tr is connected at its drain to the connection node ND2, which is connected to the second in-pixel signal line LSGN12, and at its source to the current source 1230. A reading node ND3 is formed by the connection between the drain of the source follower transistor SF-Tr and the current source 1230, and connected via an inter-block connection terminal T2 to the first in-pixel signal line LSGN11, which is connected to the source side of one of the differential transistors of the amplifier circuit 240.

The gate of the source follower transistor SF-Tr is connected to the floating diffusion FD11. In the low-gain read-out mode MLG, the source follower transistor SF-Tr converts the charges in the floating diffusion FD11 into a voltage signal determined by the quantity of the charges (potential) and outputs the thus obtained low-gain read-out voltage N1 (VRST1, VSIG1) of a column output to the first in-pixel signal line LSGN11.

The feedback capacitor CF11 is connected between the floating diffusion FD11 and the connection node ND2, which is connected to the second in-pixel signal line LSGN12. In other words, the feedback capacitor CF11 is connected in parallel with the reset transistor RST-Tr, between the floating diffusion FD11 and the connection node ND2 (second in-pixel signal line LSGN12). The feedback capacitor CF11 has electrodes one of which is connected to the floating diffusion FD11 and the other of which is connected to the second in-pixel signal line LSGN12 via the connection node ND2.

The feedback capacitor CF11 has a capacitance Cfb11. The capacitance Cfb11 of the feedback capacitor CF11 is configured to be less than the capacitance Cfd11 of the floating diffusion FD11. As using a metal-oxide-metal (MOM) capacitor, the feedback capacitor CF11 can achieve less manufacturing-induced variabilities than the conventional 4TrAPS pixels, linear response characteristics with little voltage dependence and enhanced sensitivity.

In order to accomplish low noise, the source follower transistor SF-Tr may be an embedded channel transistor. The reset transistor RST-Tr serving as a switching element may have a low threshold in order to lower the gate-source voltage required for the power-on.

Example Configuration of Amplifier Circuit 240

The amplifier circuit 240 is configured to amplify the read-out voltage signal read from the photoelectric conversion reading part 230. The amplifier circuit 240 includes a differential transistor pair 241, an active load circuit 242 and a reading circuit forming part 243.

The differential transistor pair 241 includes first and second differential transistors 241-1 and 241-2 the sources of which are connected, and the connection between the sources is connected to the current source 1230. A reference signal VOF is fed as a control signal to the gate of the first differential transistor 241-1. The differential transistor pair 241 is configured to perform differential amplification.

The second differential transistor 241-2 of the differential transistor pair 241 of the amplifier circuit 240 also serve as the source follower transistor SF-Tr. To be specific, in the amplifier circuit 240, the source of the first differential transistor 241-1 is connected to the source of the source follower transistor SF Tr via, for example, the first in-pixel signal line LSGN11, to form the differential transistor pair 241. In the first embodiment, the first differential transistor 241-1 and source follower transistor SF-Tr are formed by NMOS transistors NT21 and NT22.

The active load circuit 242 of the amplifier circuit 240 includes a first load circuit 2421 connected to the drain side of the first differential transistor 241-1 and a second load circuit 2422 connected to the drain side of the second differential transistor 241-2. In the active load circuit 242, the first and second load circuits 2421 and 2422 are connected to form a current mirror MIR including a current channel originating from the node ND4 on the drain side of the first differential transistor 241-1 to the node ND5 on the drain side of the second differential transistor 241-2.

The first load circuit 2421 includes a PMOS transistor PT21 serving as a first load transistor having a gate and a drain connected to the node ND4 on the drain side of the first differential transistor 241-1, and a PMOS transistor PT22 connected between the source of the PMOS transistor PT21 and the power supply potential VDD and having a gate connected to the reference potential VSS.

The second load circuit 2422 includes a PMOS transistor PT23 serving as a second load transistor, and a PMOS transistor PT24. The PMOS transistor PT23 has a drain connected to the second in-pixel signal line LSGN12 (node ND5) connected to the drain side of the source follower transistor SF Tr serving as the second differential transistor 242-2, and also has a gate connected to the gate and drain of the PMOS transistor PT21 serving as the first load transistor. The PMOS transistor PT24 is connected between the source of the PMOS transistor PT23 and the power supply potential VDD and has a gate connected to the reference potential VSS. The drain side of the PMOS transistor PT23 serving as the second load transistor constitutes the output node ND5 of the amplifier circuit 240 and is connected to the second in-pixel signal line LSGN12.

In the low-gain read-out mode MLG, the reading circuit forming part 243 deactivates the first load circuit 2421 in response to a control signal XSF, so that a low-gain read-out circuit 244 is formed by the second load circuit 2422 and the source follower transistor SF-Tr. In the high-gain read-out mode MHG, the reading circuit forming part 243 activates the first load circuit 2421 (keeps the first load circuit 2421 active) in response to the control signal XSF, so that a high-gain read-out circuit 245 is formed by a capacitive trans-impedance amplifier (CTIA) circuit including the feedback capacitor CF11 and the differential transistor pair 241 of the amplifier circuit 240.

The reading circuit forming part 243 is mainly constituted by an activation control circuit 2431. The activation control circuit 2431 includes a switching transistor SW-Tr having a drain connected to the gate and drain of the PMOS transistor PT21 serving as the first load transistor (the node ND4 on the drain side of the first differential transistor 241-1), a source connected to the reference potential VSS, and a gate connected to the feeding line of the control signal XSF. The switching transistor SW-Tr is constituted by a NMOS transistor NT23.

In the low-gain read-out mode MLG, the control signal XSF is supplied at the high level to the activation control circuit 2431, so that the switching transistor SW-Tr is switched to the conduction state. As a result, the activation control circuit 2431 connects the gate of the first load transistor, in other words, the gate of the PMOS transistor PT21 to a predetermined potential that is sufficient to keep the first load transistor in the conduction state (in the present example, the reference potential VSS) and also connects the gate and drain of the PMOS transistor PT21 serving as the first load transistor to the predetermined potential VSS, thereby deactivating the PMOS transistor PT21 serving as the first load transistor.

In the low-gain read-out mode MLG, the activation control circuit 2431 also connects the gate of the PMOS transistor PT23 serving as the second load transistor of the second load circuit 2422 to the reference potential VSS, so that the PMOS transistor PT23 remains in the conduction state. In the low-gain read-out mode MLG, the activation control circuit 2431 thus forms the low-gain read-out circuit 244 constituted by the second load circuit 2422 and the source follower transistor SF-Tr. In the resulting low-gain read-out circuit 244, the read-out voltage signal N1 amplified with a low gain through the source follower amplification by the source follower transistor SF-Tr is output to the first in-pixel signal line LSGN11.

In the high-gain read-out mode MHG, the control signal XSF is supplied at the low level to the activation control circuit 2431, so that the switching transistor SW-Tr is switched to the non-conduction state. As a result, the activation control circuit 2431 disconnects the gate and drain of the PMOS transistor PT21 serving as the first load transistor from the reference potential VSS, so that the PMOS transistor PT21 serving as the first load transistor is activated and the current mirror circuit is also activated. In the high-gain read-out mode MHG, the activation control circuit 2431 thus activates the first load circuit 2421, so that the high-gain read-out circuit 245 is formed by a capacitive trans-impedance amplifier (CTIA) circuit including the feedback capacitor CF11 and the differential transistor pair 241 of the amplifier circuit 240. In the formed high-gain read-out circuit 245, the capacitive trans-impedance amplifier (CTIA) circuit including the feedback capacitor CF11 and the differential transistor pair 241 of the amplifier circuit 240 produces the miller effect. As a result, the charges are transferred to the feedback capacitor CF11, and the voltage signal amplified with the high gain is output to the second in-pixel signal line LSGN12.

Example Configuration of Signal Holding Part 250

The signal holding part 250 includes sample-and-hold signal holding capacitors CS21, CR21, CS31 and CR31 for holding the read-out voltage signal amplified by the amplifier circuit 240, including the low-gain read-out voltage N1 (VRST1, VSIG1) and high-gain read-out voltage N2 (VRST2, VSIG2) and outputting the held voltage signal.

Figure 3:
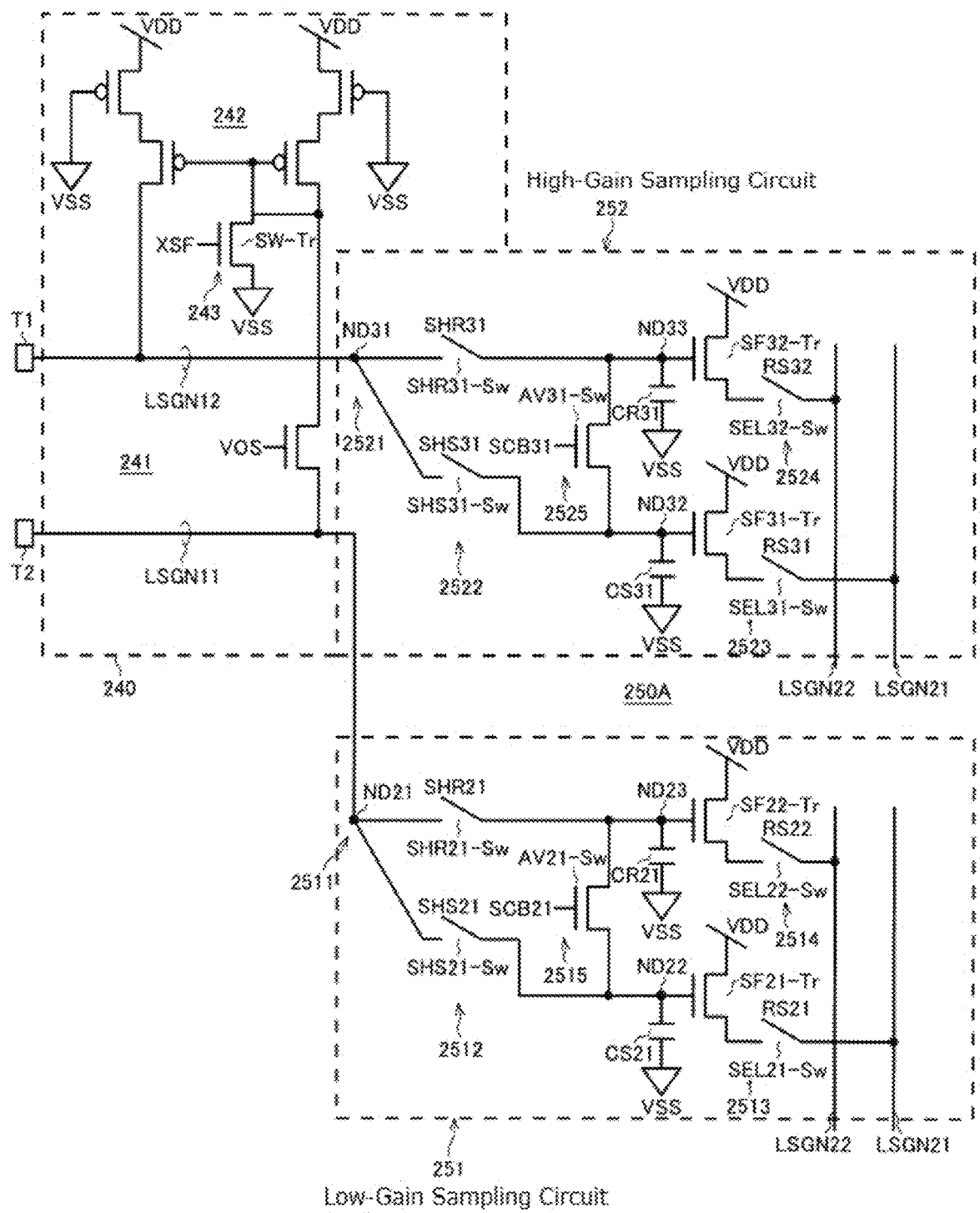
FIG. 3 shows, as an example, a basic configuration of a signal holding part relating to the first embodiment of the present invention and connections between an amplifier circuit, a first in-pixel signal line, a second in-pixel signal line and the signal holding part.

FIG. 3 shows an example of the basic configuration of the signal holding part relating to the first embodiment of the present invention and connections between the amplifier circuit, first in-pixel signal line, second in-pixel signal line and signal holding part. A signal holding part 250A shown in FIG. 3 has a basic configuration where low- and high-gain circuits do not share their elements. The signal holding part 250 shown in FIG. 2 has a simplified circuit configuration where low- and high-gain circuits share their elements. The following first describes the basic configuration shown in FIG. 3 and then the sharing configuration shown in FIG. 2.

The signal holding part 250A includes a low-gain sampling circuit 251 and a high-gain sampling circuit 252. The low-gain sampling circuit 251 is connected to the first in-pixel signal line LSGN11 and configured to sample the low-gain read-out voltage signal read onto the first in-pixel signal line LSGN11. The high-gain sampling circuit 252 is configured to sample the high-gain read-out voltage signal read onto the second in-pixel signal line LSGN12. In other words, the signal holding part 250A uses the low-gain sampling circuit 251 to sample the low-gain read-out voltage N1 (VRST1, VSIG1) and uses the high-gain sampling circuit 252 to sample the high-gain read-out voltage N2 (VRST2, VSIG2).

More specifically, the low-gain sampling circuit 251 basically includes a first input part 2511 including a first input node ND21, a first sample-and-hold part 2512, a first output part 2513, a second output part 2514, a first averaging part 2515, a first holding node ND22, and a second holding node ND23.

The first input part 2511 is connected at the first input node ND21 to the first in-pixel signal line LSGN11. In the low-gain read-out mode MLG, the first input part 2511 inputs, into the first sample-and-hold part 2512, a first read-out reset signal (VRST1) and a first read-out signal (VSIG1) read from the photoelectric conversion reading part 230 and amplifier circuit 240.

The first sample-and-hold part 2512 includes a first sampling switch (for example, a sampling transistor formed by an NMOS transistor) SHS21-Sw serving as a first switch element, a second sampling transistor (for example, a sampling transistor formed by an NMOS transistor) SHR21-Sw serving as a second switch element, a first signal holding capacitor CS21 and a second signal holding capacitor CR21.

The first sampling switch SHS21-Sw is connected between the first holding node ND22 and the first input node ND21 connected to the first in-pixel signal line LSGN11. The first sampling switch SHS21-Sw selectively establishes connection between the first signal holding capacitor CS21 of the sample-and-hold part 2512 and the first in-pixel signal line LSGN11 via the first holding node ND22 in a global shutter period or signal holding capacitor clear period. The first sampling switch SHS21-Sw is in the conduction state during a period in which, for example, a control signal SHS21 is at the high level. The first signal holding capacitor CS21 is connected between the first holding node ND22 and the reference potential VSS.

The second sampling switch SHR21-Sw is connected between the second holding node ND23 and the first input node ND21 connected to the first in-pixel signal line LSGN11. The second sampling switch SHR21-Sw selectively establishes connection between the second signal holding capacitor CR21 of the first sample-and-hold part 2512 and the first in-pixel signal line LSGN11 via the second holding node ND23 in a global shutter period or signal holding capacitor clear period. The second sampling switch SHR21-Sw is in the conduction state during a period in which, for example, a control signal SHR21 is at the high level. The second signal holding capacitor CR21 is connected between the second holding node ND23 and the reference potential VSS.

The first and second sampling switches SHS21-Sw and SHR21-Sw are formed by MOS transistors, for example, NMOS transistors.

The first output part 2513 includes a first source follower transistor SF21-Tr for basically amplifying and outputting the signal held in the first signal holding capacitor CS21 at a level determined by the held voltage in the global shutter period, and a first selection switch SEL21-Sw for selectively outputting the signal amplified by the first source follower transistor SF21-Tr to the first vertical signal line LSGN21, which is configured to be driven by a constant current source Ibias.

The first source follower transistor SF21-Tr and first selection switch SEL21-Sw are connected in series between the power supply potential VDD and the first vertical signal line LSGN21.

The first selection switch SEL21-Sw is controlled by a control signal RS21 applied to the gate thereof through a control line. The first selection switch SEL21-Sw remains selected and in the conduction state during a selection period in which the control signal RS21 is at the H level. This allows the first source follower transistor SF21-Tr1 to output, to the first vertical signal line LSGN21, read-out voltage (VSIG) of a column output corresponding to the voltage held in the first signal holding capacitor CS21.

The second output part 2514 includes a second source follower transistor SF22-Tr for basically amplifying and outputting the signal held in the second signal holding capacitor CR21 at a level determined by the held voltage in the global shutter period, and a second selection switch SEL22-Sw for selectively outputting the signal amplified by the second source follower transistor SF22-Tr to the second vertical signal line LSGN22, which is configured to be driven by the constant current source Ibias.

The second source follower transistor SF22-Tr and the second selection switch SEL22-Sw are connected in series between the power supply potential VDD and the second vertical signal line LSGN22.

The second selection switch SEL22-Sw is controlled by a control signal RS22 applied to the gate thereof through a control line. The second selection switch SEL22-Sw remains selected and in the conduction state during a selection period in which the control signal RS22 is at the H level. This allows the second source follower transistor SF22-Tr to output, to the second vertical signal line LSGN22, read-out voltage (VRST) of a column output corresponding to the voltage held in the second signal holding capacitor CR21.

The first averaging part 2515 is constituted by an averaging switch AV21-Sw serving as an averaging part connected between the first holding node ND22 and the second holding node ND23. A control signal SCB21 is fed to the gate of the averaging transistor AV21-Sw.

The control signal SCB21 is fed at the H level after reading of the first read-out signal VSIG held in the first signal holding capacitor CS21 is performed in parallel with differential reading of the second read-out reset signal VRST held in the second signal holding capacitor CR21. After this, differential reading of the averaged signal through the first output part 2513 is performed in parallel with differential reading of the averaged signal through the second output part 2514.

The high-gain sampling circuit 252 basically includes a second input part 2521 including a second input node ND31, a second sample-and-hold part 2522, a third output part 2523, a fourth output part 2524, a second averaging part 2525, a third holding node ND32, and a fourth holding node ND33.

The second input part 2521 is connected at the second input node ND31 to the second in-pixel signal line LSGN12. In the high-gain read-out mode MHG, the second input part 2521 inputs, into the second sample-and-hold part 2522, a second read-out reset signal (VRST2) and a second read-out signal (VSIG2) read from the photoelectric conversion reading part 230 and amplifier circuit 240.

The second sample-and-hold part 2522 includes a third sampling switch (for example, a sampling transistor formed by an NMOS transistor) SHS31-Sw serving as a third switch element, a fourth sampling transistor (for example, a sampling transistor formed by an NMOS transistor) SHR31-Sw serving as a fourth switch element, a third signal holding capacitor CS31 and a fourth signal holding capacitor CR31.

The third sampling switch SHS31-Sw is connected between the third holding node ND32 and the second input node ND31 connected to the second in-pixel signal line LSGN12. The third sampling switch SHS31-Sw selectively establishes connection between the third signal holding capacitor CS31 of the second sample-and-hold part 2522 and the second in-pixel signal line LSGN12 via the third holding node ND32 in a global shutter period or signal holding capacitor clear period. The third sampling switch SHS31-Sw is in the conduction state during a period in which, for example, a control signal SHS31 is at the high level. The third signal holding capacitor CS31 is connected between the third holding node ND32 and the reference potential VSS.

The fourth sampling switch SHR31-Sw is connected between the fourth holding node ND33 and the second input node ND31 connected to the second in-pixel signal line LSGN12. The fourth sampling switch SHR31-Sw selectively establishes connection between the fourth signal holding capacitor CR31 of the second sample-and-hold part 2522 and the second in-pixel signal line LSGN12 via the fourth holding node ND33 in a global shutter period or signal holding capacitor clear period. The fourth sampling switch SHR31-Sw is in the conduction state during a period in which, for example, a control signal SHR31 is at the high level. The fourth signal holding capacitor CR31 is connected between the fourth holding node ND33 and the reference potential VSS.

The third and fourth sampling switches SHS31-Sw and SHR31-Sw are formed by MOS transistors, for example, NMOS transistors.

The third output part 2523 includes a third source follower transistor SF31-Tr for basically amplifying and outputting the signal held in the third signal holding capacitor CS31 at a level determined by the held voltage in the global shutter period, and a third selection switch SEL31-Sw for selectively outputting the signal amplified by the third source follower transistor SF31-Tr to the first vertical signal line LSGN21, which is configured to be driven by the constant current source Ibias.

The third source follower transistor SF31-Tr and third selection switch SEL31-Sw are connected in series between the power supply potential VDD and the first vertical signal line LSGN21.

The third selection switch SEL31-Sw is controlled by a control signal RS31 applied to the gate thereof through a control line. The third selection switch SEL31-Sw remains selected and in the conduction state during a selection period in which the control signal RS31 is at the H level. This allows the third source follower transistor SF31-Tr1 to output, to the first vertical signal line LSGN21, second read-out voltage (VSIG) of a column output corresponding to the voltage held in the third signal holding capacitor CS31.

The fourth output part 2524 includes a fourth source follower transistor SF32-Tr for basically amplifying and outputting the signal held in the fourth signal holding capacitor CR31 at a level determined by the held voltage in the global shutter period, and a fourth selection switch SEL32-Sw for selectively outputting the signal amplified by the fourth source follower transistor SF32-Tr to the second vertical signal line LSGN22, which is configured to be driven by the constant current source Ibias.

The fourth source follower transistor SF32-Tr and the fourth selection switch SEL32-Sw are connected in series between the power supply potential VDD and the second vertical signal line LSGN22.

The fourth selection switch SEL32-Sw is controlled by a control signal RS32 applied to the gate thereof through a control line. The fourth selection switch SEL32-Sw remains selected and in the conduction state during a selection period in which the control signal RS32 is at the H level. This allows the fourth source follower transistor 5F32-Tr to output, to the second vertical signal line LSGN22, second read-out reset voltage (VRST) of a column output corresponding to the voltage held in the fourth signal holding capacitor CR31.

The averaging part 2525 is constituted by an averaging switch AV31-Sw serving as an averaging part connected between the third holding node ND32 and the fourth holding node ND33. A control signal SCB31 is fed to the gate of the averaging transistor AV31-Sw.

The control signal SCB31 is fed at the H level after reading of the second read-out signal VSIG held in the third signal holding capacitor CS31 is performed in parallel with differential reading of the second read-out reset signal VRST held in the fourth signal holding capacitor CR31. After this, differential reading of the averaged signal through the third output part 2523 is performed in parallel with differential reading of the averaged signal through the fourth output part 2524.

The above has described an example of the basic configuration of the signal holding part 250A, where the low- and high-gain sampling circuits 251 and 252 do not share their components. The signal holding part 250 relating to the first embodiment has a sharing configuration, an example of which is shown in FIG. 2. The low- and high-gain circuits share some of their elements. This can lead to simplified circuit configuration and a reduced number of transistors. The following describes the sharing configuration shown in FIG. 2 while referring to the basic configuration shown in FIG. 3. In FIG. 2, the same components as those in FIG. 3 are denoted by the same numerals for better understanding. The shared or common components are assigned with smaller ones of the corresponding reference numerals.

The signal holding part 250 shown in FIG. 2 has a first common signal holding capacitor CS21 connected to the first holding node ND22, in place of the first and third signal holding capacitors CS21 and CS31 of the low- and high-gain sampling circuits 251 and 252. Likewise, a second common signal holding capacitor CR21 is provided and connected to the second holding node ND23, in place of the second and fourth signal holding capacitors CR21 and CR31. A first common output part 2513 is provided to output a signal at a level determined by the voltage held in the first holding node ND22 to the first vertical signal line LSGN21, in place of the first and third output parts 2513 and 2523. A second common output part 2514 is provided to output a signal at a level determined by the voltage held in the second holding node ND23 to the second vertical signal line LSGN22, in place of the second and fourth output parts 2514 and 2524. A common averaging part 2515 is provided to selectively average the voltage held in the first holding node ND22 or the voltage held in the second holding node ND23, in place of the first and second averaging parts 2515 and 2525.

A first sampling switch SHS21-Sw serving as a first switch element is connected between the first holding node ND22 and the first input node ND21 connected to the first in-pixel signal line LSGN11. A second sampling switch SHR21-Sw serving as a second switch element is connected between the second holding node ND23 and the first input node ND21 connected to the first in-pixel signal line LSGN11. A third sampling switch SHS31-Sw serving as a third switch element is connected between the first holding node ND22 and the second input node ND31 connected to the second in-pixel signal line LSGN12. A fourth sampling switch SHR31-Sw serving as a fourth switch element is connected between the second holding node ND23 and the second input node ND31 connected to the second in-pixel signal line LSGN11.

As described above, in the solid-state imaging device 10 relating to the first embodiment, in the voltage mode, the pixel signal is sampled into the signal holding part 250 serving as a pixel signal storage, which takes place in all of the pixels at the same time. The signals obtained by converting the read-out signal VSIG and the read-out reset signal VRST held in the first and second signal holding capacitors CS21 and CR21 are read out to the first and second vertical signal lines LSGN21 and LSGN22, and these differential signals are fed to the column reading circuit 40.

Since the pixel part 20 includes the pixels PXL arranged in N rows and M columns, there are N control lines for each control signal, and 2×M vertical signal lines (LSGN21 and LSGN22). In FIG. 1, the control lines for each row are represented as one row-scanning control line. Similarly, the vertical signal lines LSGN21 and LSGN22 for each pixel are represented as one vertical signal line.

The vertical scanning circuit 30 drives the pixels in shutter and read-out rows through the row-scanning control lines under control of the timing control circuit 60. Further, the vertical scanning circuit 30 outputs, according to an address signal, row selection signals indicating the row addresses of the reading row from which signals are to be read out and the shutter row in which the charges stored in the photodiodes PD are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel.

The column reading circuit 40 relating to the first embodiment includes amplifiers (AMP) and sampling (S/H) circuits. The column reading circuit 40 may include a correlated double sampling (CDS) circuit, an analog-to-digital converter (ADC), and the like.

The horizontal scanning circuit 50 scans the signals processed in the plurality of column signal processing circuits of the reading circuit 40, transfers the signals in a horizontal direction, and outputs the signals to a signal processing circuit (not shown).

The timing control circuit 60 generates timing signals required for signal processing in the pixel part 20, vertical scanning circuit 30, reading circuit 40, horizontal scanning circuit 50, and the like.

<Read-Out Operation in Solid-State Imaging Device 10>

The above has described the characteristic configurations and functions of the parts of the solid-state imaging device 10. The following now describes how to read the pixel signals in the solid-state imaging device 10 relating to the first embodiment. The following first describes the operations performed in the high-gain read-out mode MHG, followed by the description of the operations performed in the low-gain read-out mode MLG.

Figure 4:
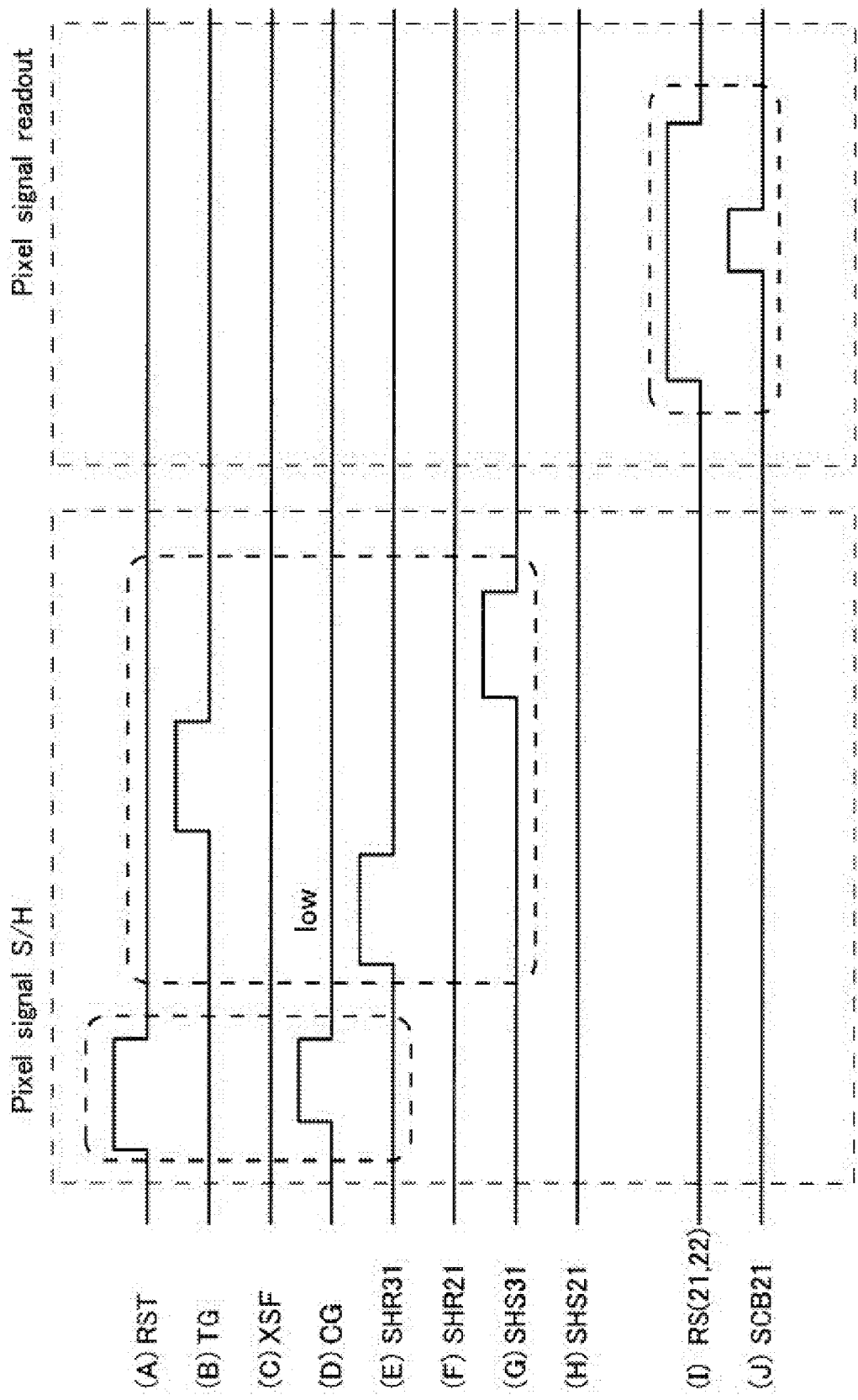
FIG. 4 is a timing chart to illustrate a reading operation performed in a high-gain read-out mode mainly by a pixel part of the solid-state imaging device relating to the first embodiment of the present invention.
Figure 5:
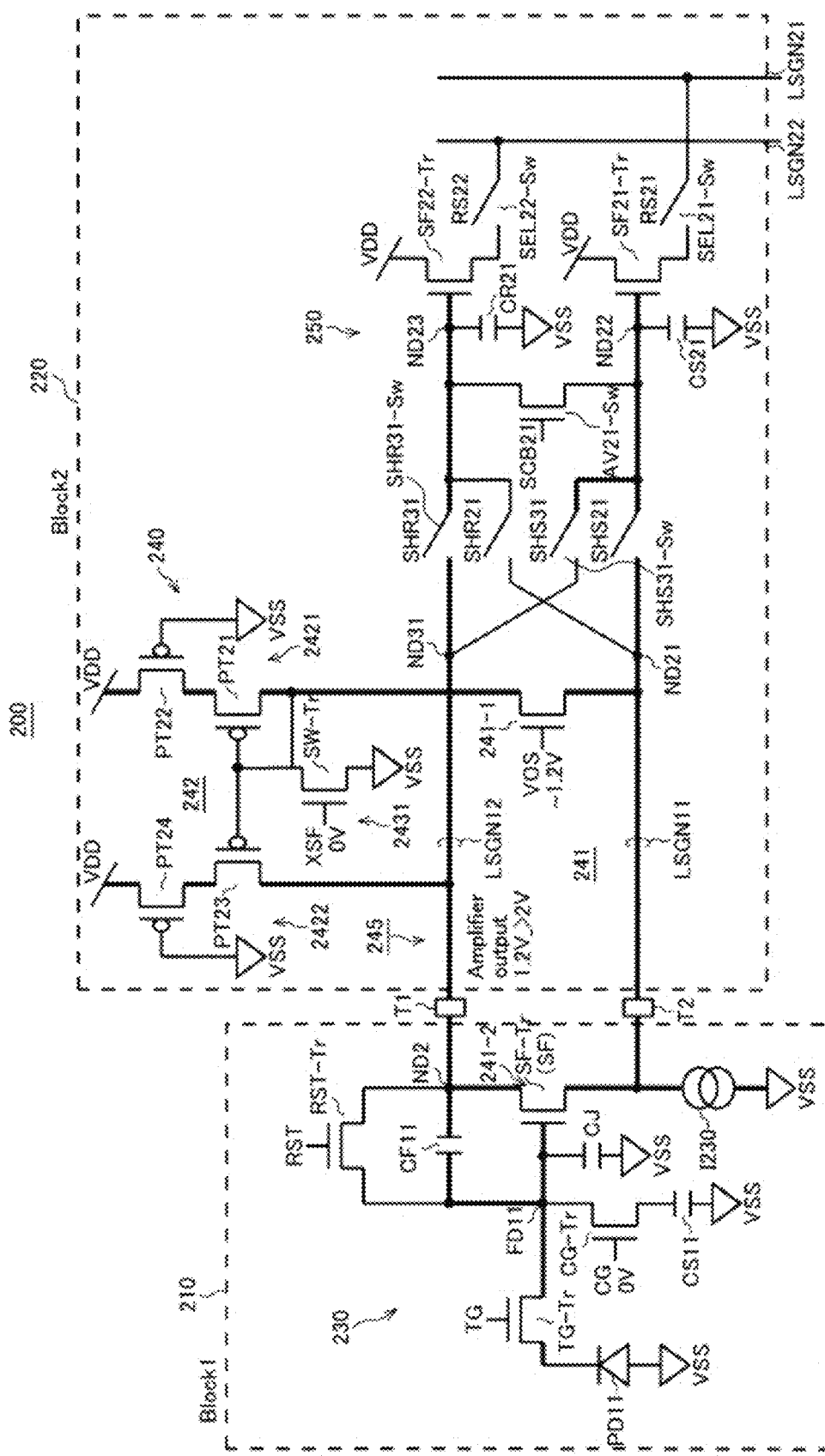
FIG. 5 shows, as an example, control signals fed to the amplifier circuit and the like and the state of a reading circuit formed in the pixel in the high gain read-out mode in the first embodiment of the present invention.
Figure 6:
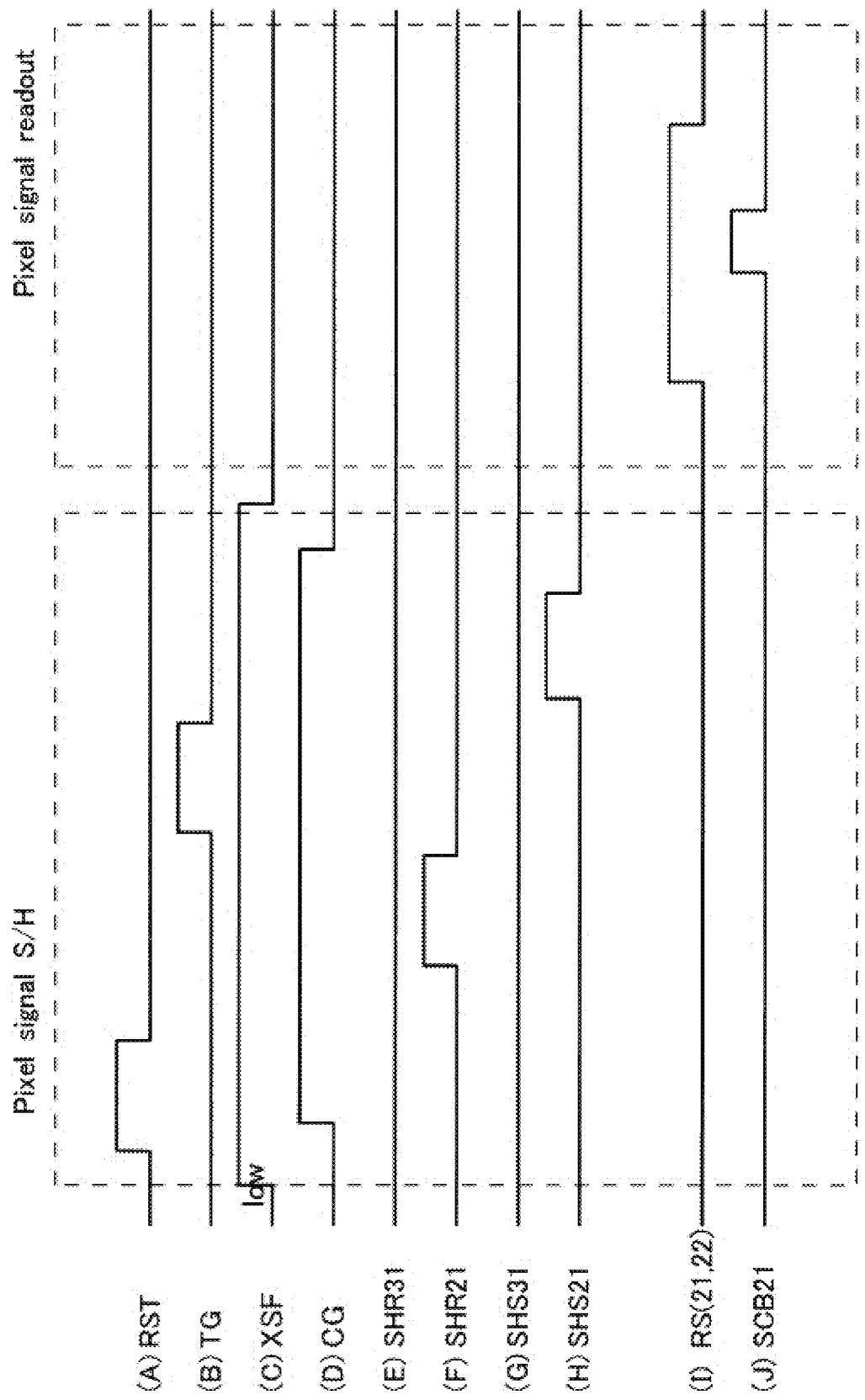
FIG. 6 is a timing chart to illustrate a reading operation performed in a low-gain read-out mode mainly by the pixel part of the solid-state imaging device relating to the first embodiment of the present invention.
Figure 7:
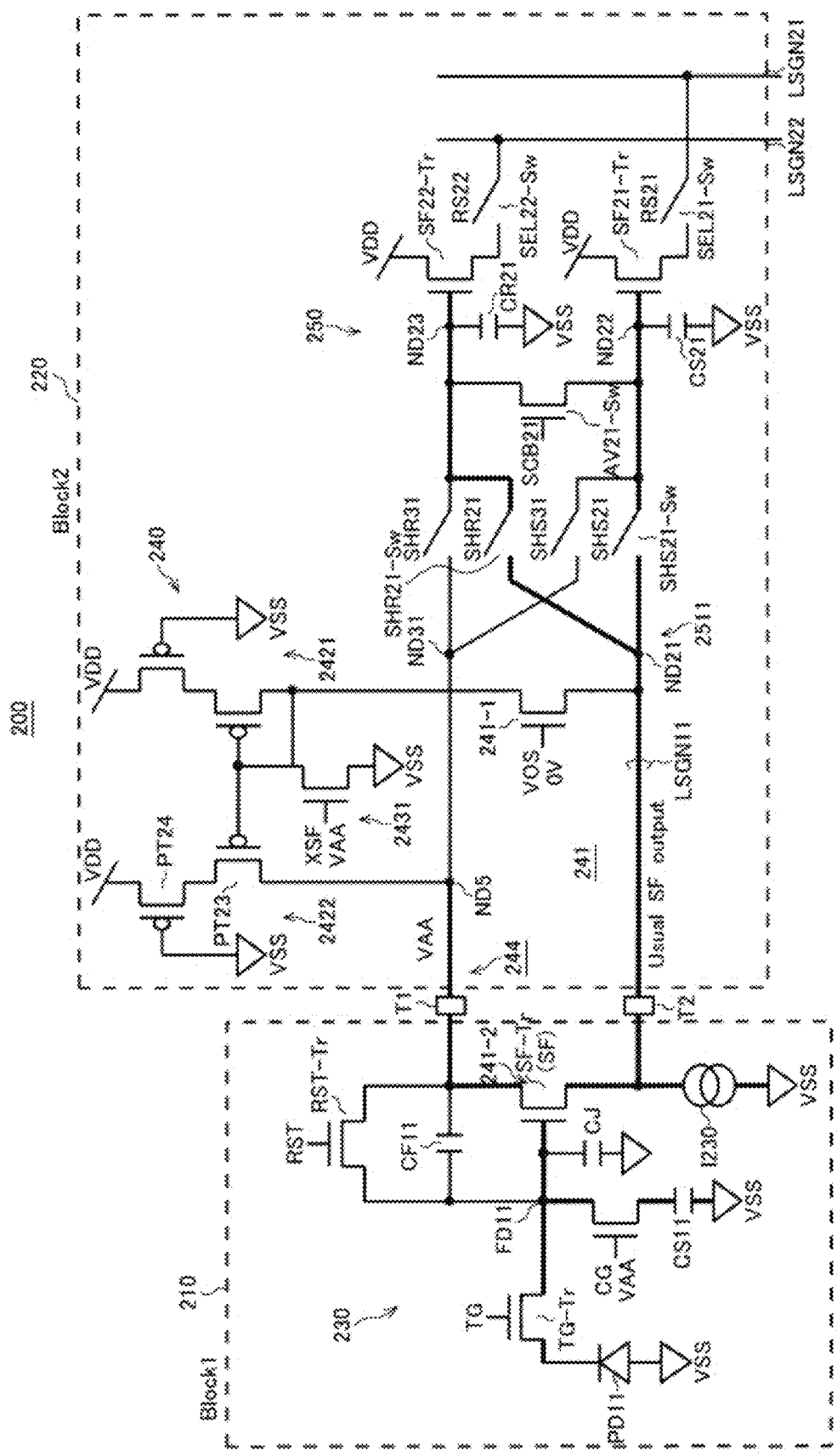
FIG. 7 shows, as an example, control signals fed to the amplifier circuit and the like and the state of a reading circuit formed in the pixel in the low gain read-out mode in the first embodiment of the present invention.

FIG. 4 is a timing chart including waveforms (A) to (J) to illustrate a reading operation performed in the high-gain read-out mode mainly by the pixel part of the solid-state imaging device relating to the first embodiment of the present invention. FIG. 5 shows, as an example, the control signals fed to the amplifier circuit and the like and the state of the reading circuit formed in the pixel in the high gain read-out mode in the first embodiment of the present invention. FIG. 6 is a timing chart including waveforms (A) to (J) to illustrate a reading operation performed in the low-gain read-out mode mainly by the pixel part of the solid-state imaging device relating to the first embodiment of the present invention. FIG. 7 shows, as an example, the control signals fed to the amplifier circuit and the like and the state of the reading circuit formed in the pixel in the low-gain read-out mode in the first embodiment of the present invention.

In FIGS. 4 and 6, the waveform (A) shows the control signal RST for the reset transistor RST-Tr of the photoelectric conversion reading part 230 of the pixel 200. In FIGS. 4 and 6, the waveform (B) shows the control signal TG for the transfer transistor TG-Tr of the photoelectric conversion reading part 230 of the pixel 200. In FIGS. 4 and 6, the waveform (C) shows the control signal XSF for the switching transistor SW-Tr of the reading circuit forming part 243 of the pixel 200. In FIGS. 4 and 6, the waveform (D) shows the control signal CG for the storage transistor CG-Tr of the photoelectric conversion reading part 230 of the pixel 200. In FIGS. 4 and 6, the waveform (E) shows the control signal SHR31 for the fourth sampling switch SHR31-Sw of the high-gain sampling circuit 252 of the signal holding part 250. In FIGS. 4 and 6, the waveform (F) shows the control signal SHR21 for the second sampling switch SHR21-Sw of the low-gain sampling circuit 251 of the signal holding part 250. In FIGS. 4 and 6, the waveform (G) shows the control signal SHS31 for the third sampling switch SHS31-Sw of the high-gain sampling circuit 252 of the signal holding part 250. In FIGS. 4 and 6, the waveform (H) shows the control signal SHS21 for the first sampling switch SHS21-Sw of the low-gain sampling circuit 251 of the signal holding part 250. In FIGS. 4 and 6, the waveform (I) shows the control signals RS21 and RS22 for the selection switches SEL21-Sw and SEL22-Sw of the signal holding part 250 of the pixel 200. In FIGS. 4 and 6, the waveform (J) shows the control signal SCB21 for the averaging switch AV21-Sw of the signal holding part 250 of the pixel 200.

<Reading Operation in High-Gain Read-Out Mode MHG>

In the high-gain read-out mode MHG, the control signal XSF is supplied at the low level (OV) to the activation control circuit 2431, so that the switching transistor SW-Tr is switched to the non-conduction state, as shown in the waveform (C) in FIG. 4 and FIG. 5. As a result, the activation control circuit 2431 disconnects the gate and drain of the PMOS transistor PT21 serving as the first load transistor from the reference potential VSS, so that the PMOS transistor PT21 serving as the first load transistor is activated and the current mirror circuit is also activated. In the high-gain read-out mode MHG, the reading circuit forming part 2431 thus activates the first load circuit 2421, so that the high-gain read-out circuit 245 is formed by a capacitive trans-impedance amplifier (CTIA) circuit including the feedback capacitor CF11 and the differential transistor pair 241 of the amplifier circuit 240. In the formed high-gain read-out circuit 245, the capacitive trans-impedance amplifier (CTIA) circuit including the feedback capacitor CF11 and the differential transistor pair 241 of the amplifier circuit 240 produces the miller effect. As a result, the charges are transferred to the feedback capacitor, and the voltage signal amplified with the high gain is output to the second in-pixel signal line LSGN12.

As indicated by the waveform (A) in FIG. 4, the period during which the reset control signal RST is activated or at the high level corresponds to a node reset period for the floating diffusion FD11 and storage capacitor CS11. In addition, the feedback capacitor CF11 of the pixel 200 is electrically connected to the second in-pixel signal line LSGN12. Subsequently, as shown by the waveform (E) in FIG. 4, the control signal SHR31 for turning on or off the reset sampling switch SHR31-Sw of the high-gain sampling circuit 252 is set at the H level, so that the reset sampling switch SHR31-Sw is turned on.

As shown by the waveform (A) in FIG. 4, in the node reset period for the floating diffusion FD11, the reset transistor RST-Tr remains selected and in the conduction state during a period in which the control signal RST applied to the control line is at the H level, so that the potential of the floating diffusion FD11 and the second in-pixel signal line LSGN12 for receiving the output from the amplifier circuit (error amplifier) 240 are reset to and fixed at the reference voltage VREF (VDD). In the above-mentioned reset period, as shown by the waveform (D) in FIG. 4, the storage transistor CG-Tr remains selected and in the conduction state during a period in which the control signal CG applied to the control line is at the H level so as to reset (discharge) the charges in the storage capacitor CS11.

Upon elapse of this reset period (or after the reset transistor RST-Tr is brought into the non-conduction state), a settling period starts following the end of the resetting of the FD node and ends when the control signal SHR31 is set at the L level, which takes place before the start of a transfer period. Since the control signal XSF for the switching transistor SW-Tr remains at the L level, ending the resetting of the FD node can result in keeping the output of the amplifier circuit (error amplifier) 240 at a fixed voltage level (VREF). The output of the amplifier circuit 240 is fed to the common high-gain sampling circuit (252), which achieves the high gain due to the clock feedthrough of the reset transistor RST-Tr.

Until the end of the settling period, the high-gain read-out reset voltage VRST2 is sampled by the high-gain sampling circuit 252.

The reset voltage read-out period subsequently ends, and a transfer period starts for transferring the stored charges. During the transfer period, as shown by the waveform (B) of FIG. 4, the transfer transistor TG Tr remains selected and in the conduction state in the period in which the control signal TG applied to the control line is at the high (H) level, so that the charges (electrons) produced by the photoelectric conversion and then stored in the photodiode PD11 are transferred to the floating diffusion FD11.

As a result, the high-gain read-out signal voltage N2 (VSIG), which is output to the second in-pixel signal line LSGN12 connected to the output from the amplifier circuit (error amplifier) 240, rises. On the other hand, the node voltage of the floating diffusion FD11 drops, and so does the pixel low-gain SF amplifier output on the first in-pixel signal line LSGN11. If such occurs, the output side of the amplifier circuit (error amplifier) 240 continues to rise until saturation is reached. Beyond the full well capacity, the pixel SF amplifier output voltage starts dropping. Due to the high gain, the change in the output side of the amplifier circuit (error amplifier) 240 is greater than the change in the pixel SF amplifier output voltage.

As shown by the waveform (G) in FIG. 4, the control signal SHS31 for turning on and off the signal sampling switch SHS31-Sw of the common high-gain sampling circuit 252 is set at the H level, so that the signal sampling switch SHS31-Sw is turned on.

Upon elapse of the transfer period (or after the transfer transistor TG-Tr is brought into the non-conduction state), a signal voltage period starts to read the signal voltage VSIG determined by the charges generated by the photoelectric conversion and stored in the photodiode PD11. Specifically, this period is the settling period following the transfer of the signal charges.

During this period, the high-gain read-out signal voltage N2 (VSIG2) is output to the second vertical signal line LSGN12 and fed to the high-gain sampling circuit 252.

The high-gain read-out signal voltage VSIG2 is then sampled by the high-gain sampling circuit 252. The column reading circuit 40, which constitutes part of the reading part 70, calculates a difference between the high-gain signal voltage VSIG2 and the reset voltage VRST2 (VRST2–VSIG2), to extract the signal component.

To do so, as shown by the waveform (I) in FIG. 4, the held signals are read by selecting a given one of the rows in the pixel array. To make such a selection, the control signals RS21, RS22 for the selection switches SEL21-Sw and SEL22-Sw in the selected row are set to the H level, so that these selection switches SEL21-Sw and SEL22-Sw are brought into the conduction state. Thus, reading of the read-out signal VSIG held in the first signal holding capacitor CS21 and reading of the read-out reset signal VRST held in the second signal holding capacitor CR21 are performed in parallel.

In each signal holding part 250, the first source follower transistor SF21-Tr connected to the holding node ND22 outputs, to the first vertical signal line LSGN21, the read-out signal VSIG of a column out at a level corresponding to the voltage held in the first signal holding capacitor CS21 connected to the holding node ND22. The read-out signal VSIG is fed to the reading circuit 40 for differential reading.

In parallel, in each signal holding part 250, the second source follower transistor SF22-Tr connected to the holding node ND23 outputs, to the second vertical signal line LSGN22, the read-out reset signal VRST of a column output at a level corresponding to the voltage held in the second signal holding capacitor CR21 connected to the holding node ND23. The read-out reset signal VRST is fed to the reading circuit 40 for differential reading.

As shown in the waveform (J) in FIG. 4, in the signal holding part 250, the control signal SCB21 is switched to the H level, so that the averaging switch AV21-Sw is switched into the conduction state. This can result in averaging the reset level and the signal level for the selected row. At a predetermined timing after the control signal SCB21 is switched to the L level, the read-out signal VSIG held in the first signal holding capacitor CS21 and the read-out reset signal VRST held in the second signal holding capacitor CR21 are averaged and the signals are read in parallel.

In each signal holding part 250, the first source follower transistor SF21-Tr connected to the holding node ND22 outputs an averaged signal of a column output to the first vertical signal line LSGN21 at a level corresponding to the averaged voltage in the holding node ND22. The averaged signal is fed to the column reading circuit 40. In parallel, in each signal holding part 250, the second source follower transistor SF22-Tr connected to the holding node ND23 outputs an averaged signal of a column output to the second vertical signal line LSGN22 at a level corresponding to the averaged voltage in the holding node ND23. The averaged signal is fed to the column reading circuit 40.

<Configuration of Reading Circuit for Low-Gain Read-Out Mode MLG)

In the low-gain read-out mode MLG, the control signal XSF is supplied at the high level (VAA) to the activation control circuit 2431 as shown in the waveform (C) in FIG. 6 and FIG. 7, so that the switching transistor SW-Tr is switched to the conduction state. As a result, the activation control circuit 2431 connects the gate of the first load transistor, in other words, the gate of the PMOS transistor PT21 to a predetermined potential that is sufficient to keep the first load transistor in the conduction state (in the present example, the reference potential VSS) and also connects the gate and drain of the PMOS transistor PT21 serving as the first load transistor to the predetermined potential VSS, thereby deactivating the PMOS transistor PT21 serving as the first load transistor.

In the low-gain read-out mode MLG, the activation control circuit 2431 also connects the gate of the PMOS transistor PT23 serving as the second load transistor of the second load circuit 2422 to the reference potential VSS, so that the PMOS transistor PT23 remains in the conduction state. In the low-gain read-out mode MLG, the activation control circuit 2431 thus forms the low-gain read-out circuit 244 constituted by the second load circuit 2422 and the source follower transistor SF-Tr. In the resulting low-gain read-out circuit 244, the read-out voltage signal amplified with a low gain through the source follower amplification by the source follower transistor SF-Tr is output to the first in-pixel signal line LSGN11.

In the low-gain read-out mode MLG, the control signal CG for the storage transistor CG-Tr is set at the high level for most of the period as shown in the waveform (D) in FIG. 6, so that the storage transistor CG-Tr remains in the conduction state. Accordingly, through the period of the low-gain read-out mode MLG, the floating diffusion FD11 and storage capacitor CS11 remain connected, so that the gain of the source follower transistor SF Tr stays low.

During the reset period, the control signal SHS21 for the first sampling switch SHS21-Sw, the control signal SHR21 for the second sampling switch SHR21-Sw, the control signal SCB21 for the averaging switch AV21-Sw, and the control signals RS1 and RS2 for the selections witches SEL21-Sw and SEL22-Sw are set at the L level, so that the first sampling switch SHS21-Sw, the second sampling switch SHR21-Sw, the averaging switch AV21-Sw, and the selection switches SEL21-Sw and SEL22-Sw are controlled to be in the non-conduction state.

With these settings, in the reset period, the reset transistor RST-Tr remains selected and in the conduction state during a period in which the control signal RST is at the H level, so that the floating diffusion FD11 is reset to the potential of the power supply potential VDD, as shown by the waveform (A) in FIG. 6. Subsequently, to end the reset period, the control signal RST for the reset transistor RST-Tr is switched to the L level, so that the reset transistor RST-Tr is brought into the non-conduction state.

Concurrently and in parallel with the switching of the control signal RST for the reset transistor RST-Tr to the L level, the control signals SHS21 and SHR21 for the first and second sampling switches SHS21-Sw and SHR21-Sw are kept at the L level in the signal holding part 250. Following the end of the reset period, the following control is performed in all of the signal holding parts 250 of the pixel array. As shown in the waveform (F) in FIG. 6, in the signal holding part 250, the control signal SHR21 is switched to and remains at the H level for a predetermined period, so that the second sampling switch SHR21-Sw is switched into and stays in the conduction state.

In this manner, at a predetermined timing, the charges in the floating diffusion FD11 serving as the output node are converted by the source follower transistor SF-TR into the voltage signal VRST at a level corresponding to the amount of charges in the photoelectric conversion reading part 230, and the voltage signal VRST is fed to the input part 2511 of the signal holding part 250 and held in the second signal holding capacitor CR21 through the second sampling switch SHR21-Sw.

After the read-out signal VRST is held in the second signal holding capacitor CR21, the control signal SHR21 is switched to the L level, so that the second sampling switch SHR21-Sw is brought into the non-conduction state.

Here, a transfer period represents a predetermined period of time including a predetermined point of time. In the transfer period, the transfer transistor TG-Tr in each photoelectric conversion reading part 230 remains selected and in the conduction state during a period in which the control signal TG is at the H level as shown in the waveform (B) in FIG. 6, so that the charges (electrons) produced by the photoelectric conversion and then stored in the photodiode PD11 are transferred to the floating diffusion FD11. After the transfer period ends, the control signal TG for the transfer transistor TG-Tr is switched to the L level, so that the transfer transistor TG-Tr is brought into the non-conduction state.

Subsequently, the following control is performed in all of the signal holding parts 250. As shown in the waveform (H) in FIG. 6, in the signal holding part 250, the control signal SHS21 is switched to and remains at the H level for a predetermined period, so that the first sampling switch SHS21-Sw is switched into and stays in the conduction state.

In this manner, the charges in the floating diffusion FD11 serving as the output node are converted by the source follower transistor SF-Tr into the voltage signal VSIG at a level corresponding to the amount of charges in the photoelectric conversion reading part 230, and the voltage signal VSIG is fed to the signal holding part 250 through the first in-pixel signal line LSGN11. The voltage signal VSIG is fed to the input part 2511 of the signal holding part 250 and held in the first signal holding capacitor CS21 via the first sampling switch SHS21-Sw.

After the read-out signal VSIG is held in the first signal holding capacitor CS21, the control signal SHS21 is switched to the L level, so that the first sampling switch SHS21-Sw is brought into the non-conduction state.

The held signals can be read by selecting a given one of the rows in the pixel array. To make such a selection, the control signals RS21 and RS22 for the selection switches SEL21-Sw and SEL22-Sw in the selected row are set to the H level as shown by the waveform (I) in FIG. 6, so that these selection switches SEL21-Sw and SEL22-Sw are brought into the conduction state. Reading of the read-out signal VSIG held in the first signal holding capacitor CS21 is performed in parallel with reading of the read-out reset signal VRST held in the second signal holding capacitor CR21.

Specifically, in each signal holding part 250, the first source follower transistor SF21-Tr connected to the holding node ND22 outputs, to the first vertical signal line LSGN21, the read-out signal VSIG of a column output at a level corresponding to the voltage held in the first signal holding capacitor CS21 connected to the holding node ND22. The read-out signal VSIG is fed to the reading circuit 40 for differential reading. In parallel, in each signal holding part 250, the second source follower transistor SF22-Tr connected to the holding node ND23 outputs, to the second vertical signal line LSGN22, the read-out reset signal VRST of a column output at a level corresponding to the voltage held in the second signal holding capacitor CR21 connected to the holding node ND23. The read-out reset signal VRST is fed to the reading circuit 40 for differential reading.

After this, as shown in the waveform (J) in FIG. 6, in the signal holding part 250, the control signal SCB21 is switched to and remains at the H level for a predetermined period, so that the averaging switch AV21-Sw is switched into the conduction state. This can result in averaging the reset level and the signal level for the selected row. After the control signal SCB21 is switched to the L level, the read-out signal VSIG held in the first signal holding capacitor CS21 and the read-out reset signal VRST held in the second signal holding capacitor CR21 are averaged, and the resulting signals are read in parallel.

In each signal holding part 250, the first source follower transistor SF21-Tr connected to the holding node ND22 outputs the averaged signal of a column output to the first vertical signal line LSGN21 at a level corresponding to the averaged voltage in the holding node ND22. The averaged signal is fed to the column reading circuit 40. In parallel, in each signal holding part 250, the second source follower transistor SF22-Tr connected to the holding node ND23 outputs the averaged signal of a column output to the second vertical signal line LSGN22 at a level corresponding to the averaged voltage in the holding node ND23. The averaged signal is fed to the column reading circuit 40.

As described above, the solid-state imaging device 10 relating to the first embodiment includes the VMGS pixels 200. Each VMGS pixel 200 includes the photoelectric conversion reading part 230, amplifier circuit 240, signal holding part 250, first in-pixel signal line LSGN11 and second in-pixel signal line LSGN12. The photoelectric conversion reading part 230 is configured to store electric charges resulting from photoelectric conversion and produce a readable voltage signal having a level determined by the amount of stored charges. The amplifier circuit 240 is configured to amplify the voltage signal read from the photoelectric conversion reading part 230. The signal holding part 250 includes the sample-and-hold signal holding capacitor for holding the read-out voltage signal amplified by the amplifier circuit 240 and outputting the held voltage signal. The low-gain read-out voltage signal is output to the first in-pixel signal line LSGN11. The second in-pixel signal line LSGN12 is connected to the output side of the amplifier circuit 240, and the high-gain read-out voltage signal is output to the second in-pixel signal line LSGN12. The photoelectric conversion reading part 230 includes: the photodiode PD11 for storing the charges generated by photoelectric conversion in the integration period; the transfer transistor TG-Tr serving as the transfer element for transferring the charges stored in the photodiode PD11 in the transfer period; the floating diffusion FD11 serving as the output node ND1 to which the charges stored in the photodiode PD11 are transferred through the transfer transistor; the source follower transistor SF-Tr for converting the charges in the output node into the voltage signal having a level determined by the amount of charges; the reset transistor RST-Tr serving as the reset element for resetting in the reset period the floating diffusion to the potential of the second in-pixel signal line LSGN12 or to a predetermined potential; and the feedback capacitor CF11 having electrodes one of which is connected to the floating diffusion FD and the other of which is connected to the second in-pixel signal line LSGN12. The first in-pixel signal line LSGN11 is connected to the output line of the voltage signal from the source follower transistor SF-Tr and to the input side of the amplifier circuit 240. The second differential transistor of the differential transistor pair 241 of the amplifier circuit 240 also serves as the source follower transistor SF-Tr.

In the first embodiment, in the low-gain read-out mode MLG, the reading circuit forming part 243 deactivates the first load circuit 2421, so that the low-gain read-out circuit 244 is formed by the second load circuit 2422 and the source follower transistor SF-Tr. In the resulting low-gain read-out circuit 244, the read-out voltage signal amplified with a low gain through the source follower amplification by the source follower transistor SF-Tr is output to the first in-pixel signal line LSGN11. In the high-gain read-out mode MHG, the reading circuit forming part 243 activates the first load circuit 2421, so that the high-gain read-out circuit 245 is formed by the capacitive trans-impedance amplifier (CTIA) circuit including the feedback capacitor CF11 and the differential transistor pair 241 of the amplifier circuit 240. In the formed high-gain read-out circuit 245, the capacitive trans-impedance amplifier (CTIA) circuit including the feedback capacitor CF11 and the differential transistor pair 241 of the amplifier circuit 240 produces the miller effect. As a result, the charges are transferred to the feedback capacitor CF11, and the voltage signal amplified with the high gain is output to the second in-pixel signal line LSGN12.

The solid-state imaging device 10 relating to the first embodiment can achieve reduced noise at the voltage sample-and-hold node without requiring an increase in the capacitance value of the voltage sample-and-hold signal holding capacitor, thereby achieving a high pixel gain in a high gain mode while keeping a low gain for a high-luminance optical signal, accomplishing low conversion gain read-out in a low gain mode, and substantially realizing enhanced dynamic range and increased frame rate.

Since a conversion gain beyond 600 to 800 uV/e is expected in the high-gain mode, the noise can be significantly reduced. In the low-gain mode, the conversion gain is 100 uV/e or less. Accordingly, any desired saturation can be achieved. Additional storage capacitors may lead to enhancement of LFW for more intense optical signals. In the capacitive trans-impedance amplifier (CTIA) circuit including the feedback capacitor and the differential transistor pair of the amplifier circuit 240, the source follower transistor SF-Tr or the pixel amplifier transistor serves as the negative input node of the differential amplifier. This can enormously lower the power consumption. Although the sharing may cause an increase in parasitic capacitance, this does not affect the conversion gain. The amplifier circuit 240 relating to the present embodiment can change the operation mode from the high-gain mode (CTIA) mode to the low-gain mode (SF mode) without causing a loss in signal charges.

Second Embodiment

Figure 8:
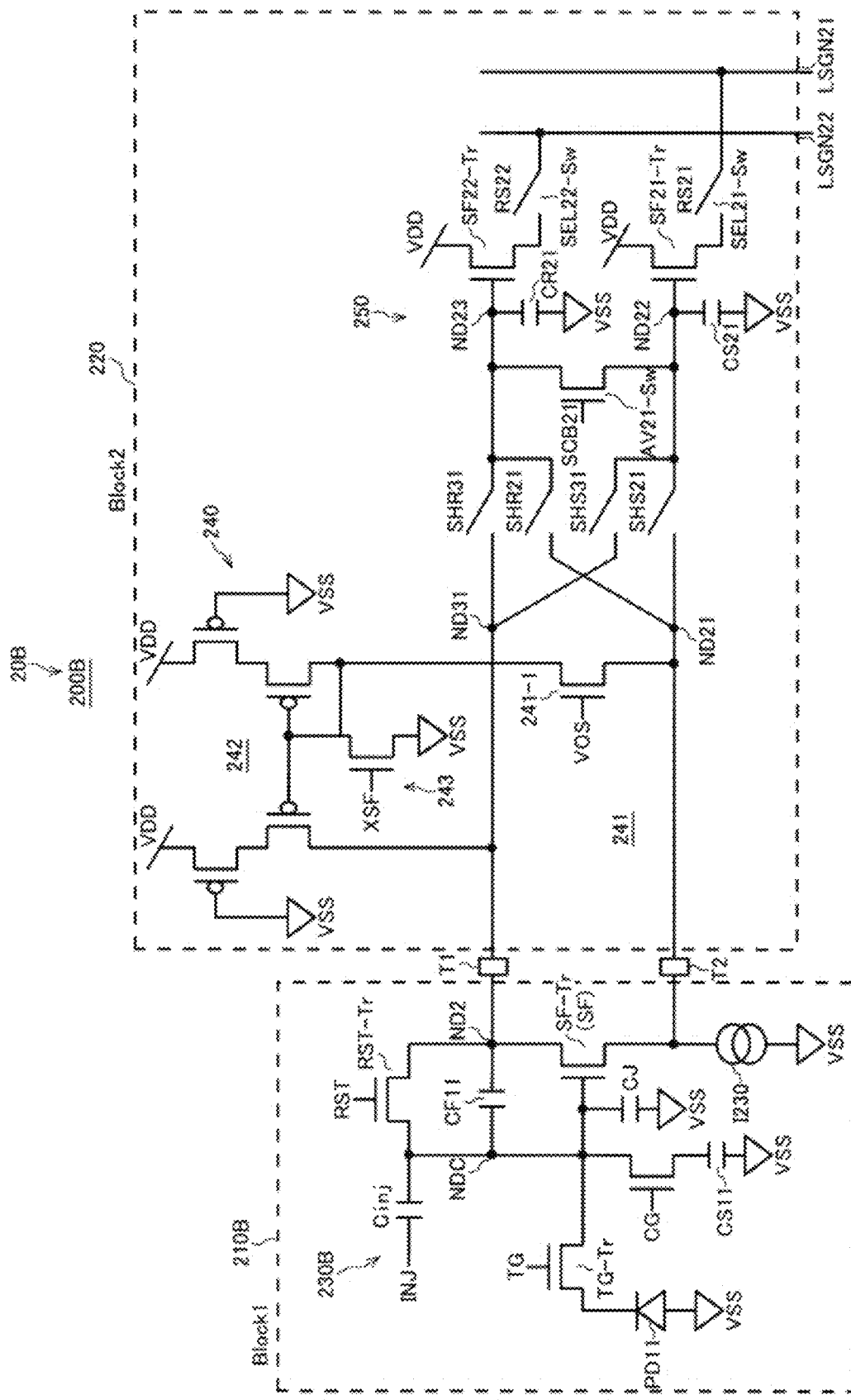
FIG. 8 shows an example configuration of a pixel according to a second embodiment of the present invention.
Figure 9:
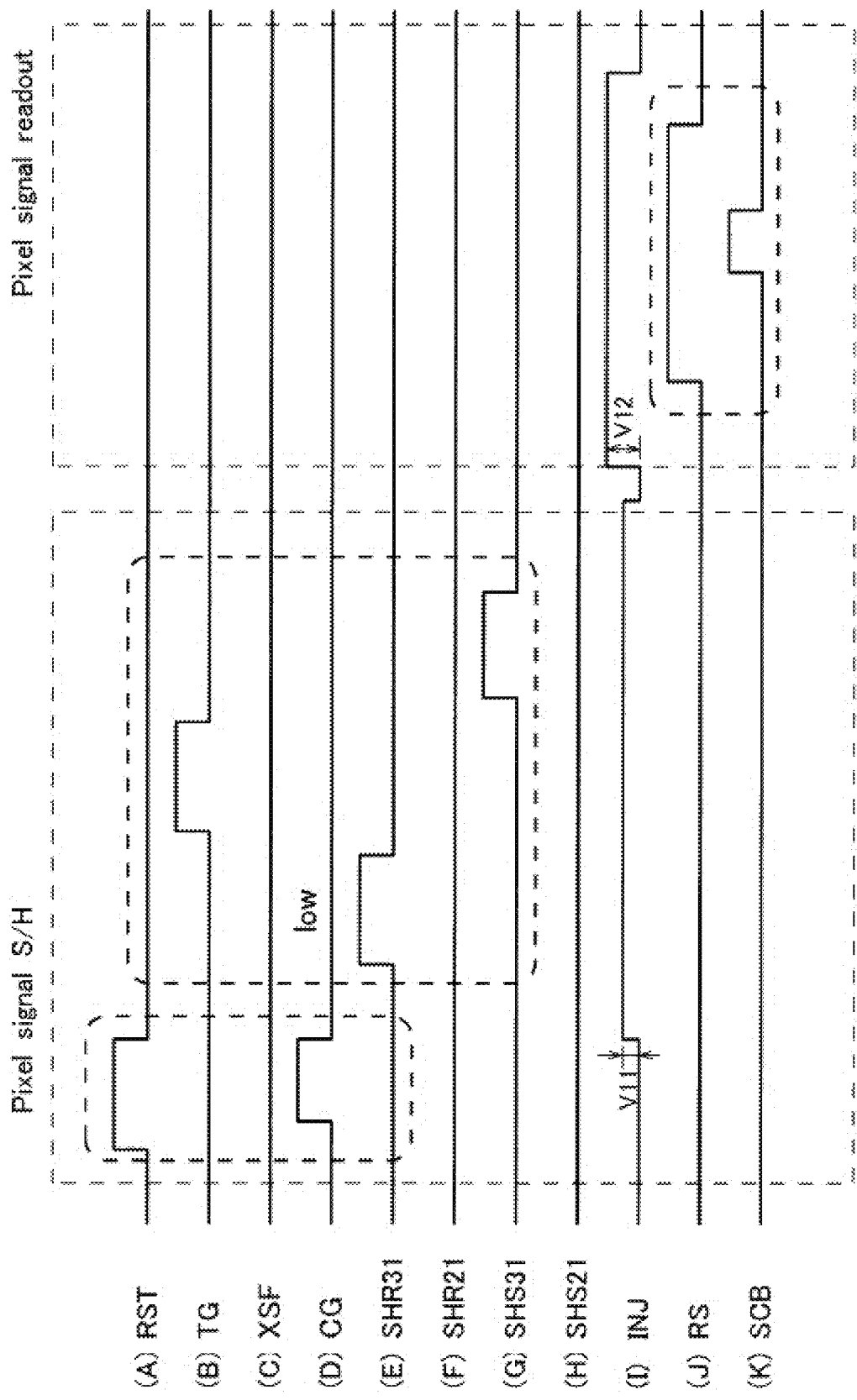
FIG. 9 is a timing chart to illustrate a reading operation mainly performed in a pixel part having a charge injection guarantee function in a solid-state imaging device relating to the second embodiment of the present invention.

FIG. 8 shows an example configuration of a pixel according to a second embodiment of the present invention. FIG. 9 is a timing chart including waveforms (A) to (I) to illustrate a reading operation mainly performed in a pixel part having a charge injection guarantee function in a solid-state imaging device relating to the second embodiment of the present invention.

In FIG. 9, the waveform (A) shows the control signal RST for the reset transistor RST-Tr of the photoelectric conversion reading part 230 of the pixel 200B. In FIG. 9, the waveform (B) shows the control signal TG for the transfer transistor TG-Tr of the photoelectric conversion reading part 230 of the pixel 200B. In FIG. 9, the waveform (C) shows the control signal XSF for the switching transistor SW-Tr of the reading circuit forming part 243 of the pixel 200B. In FIG. 9, the waveform (D) shows the control signal CG for the storage transistor CG-Tr of the photoelectric conversion reading part 230 of the pixel 200B. In FIG. 9, the waveform (E) shows the control signal SHR31 for the fourth sampling switch SHR31-Sw of the high-gain sampling circuit 252 of the signal holding part 250. In FIG. 9, the waveform (F) shows the control signal SHR21 for the second sampling switch SHR21-Sw of the low-gain sampling circuit 251 of the signal holding part 250. In FIG. 9, the waveform (G) shows the control signal SHS31 for the third sampling switch SHS31-Sw of the high-gain sampling circuit 252 of the signal holding part 250. In FIG. 9, the waveform (H) shows the control signal SHS21 for the first sampling switch SHS21-Sw of the low-gain sampling circuit 251 of the signal holding part 250. In FIG. 9, the waveform (I) shows a charge injection control signal MI for controlling injection of charges into the floating diffusion FD11 of the pixel 200B. In FIG. 9, the waveform (J) shows the control signals RS21 and RS22 for the selection switches SEL21-Sw and SEL22-Sw of the signal holding part 250 of the pixel 200B. In FIG. 9, the waveform (K) shows the control signal SCB21 for the averaging switch AV21-Sw of the signal holding part 250 of the pixel 200B.

The pixel 200B of the second embodiment differs from the pixel 200 of the first embodiment in the following points. In the pixel 200B relating to the second embodiment, a charge compensation capacitor Cinj is connected to the connection node (CF node) NDC between the floating diffusion FD11 and the reset transistor RST-Tr, in order to compensate for the charges injected from the reset transistor RST-Tr after resetting. The charge compensation capacitor Cinj has electrodes one of which is connected to the connection node NDC and the other of which is connected to the feeding line of the charge injection control signal INJ.

According to the second embodiment, the charge injection control signal (pulse) INJ is applied to the capacitor Cinj after the end of the reset period, so that charges are injected into the floating diffusion FD11 for offset correction. In the present example, the capacitor Cinj, which has a small capacitance, is connected to the floating diffusion FD11, so that a negative pulse is applied to the capacitor Cinj after the reset transistor RST-Tr is switched into the non-conduction state (turned off).

Since the pixel relating to the second embodiment has a very high conversion gain, the amplifier circuit 240 is affected by the charges injected from the reset transistor RST-Tr. In the worst scenario, the feedthrough chargers may possibly saturate the output from the amplifier. To address this issue, the INJ pulse is applied after the resetting in the second embodiment. This can result in injecting compensation charges into the CF node (connection node) NDC. Additionally, by raising the voltage applied to the INJ node, the circuit dynamic range in the source follow mode for the low-gain read-out can be optimized (maximized). The charge injection pulse INJ is applied at a first voltage V11 in the high-gain read-out mode MHG, and at a second voltage V12 higher than the first voltage V11 (>V11) in the low-gain read-out mode MLG. According to the pixel configuration relating to the second embodiment, which provides for a high conversion gain, the reset (RST) charge feedthrough compensation is advantageous to maintain the range of the amplifier circuit.

Third Embodiment

Figure 10:
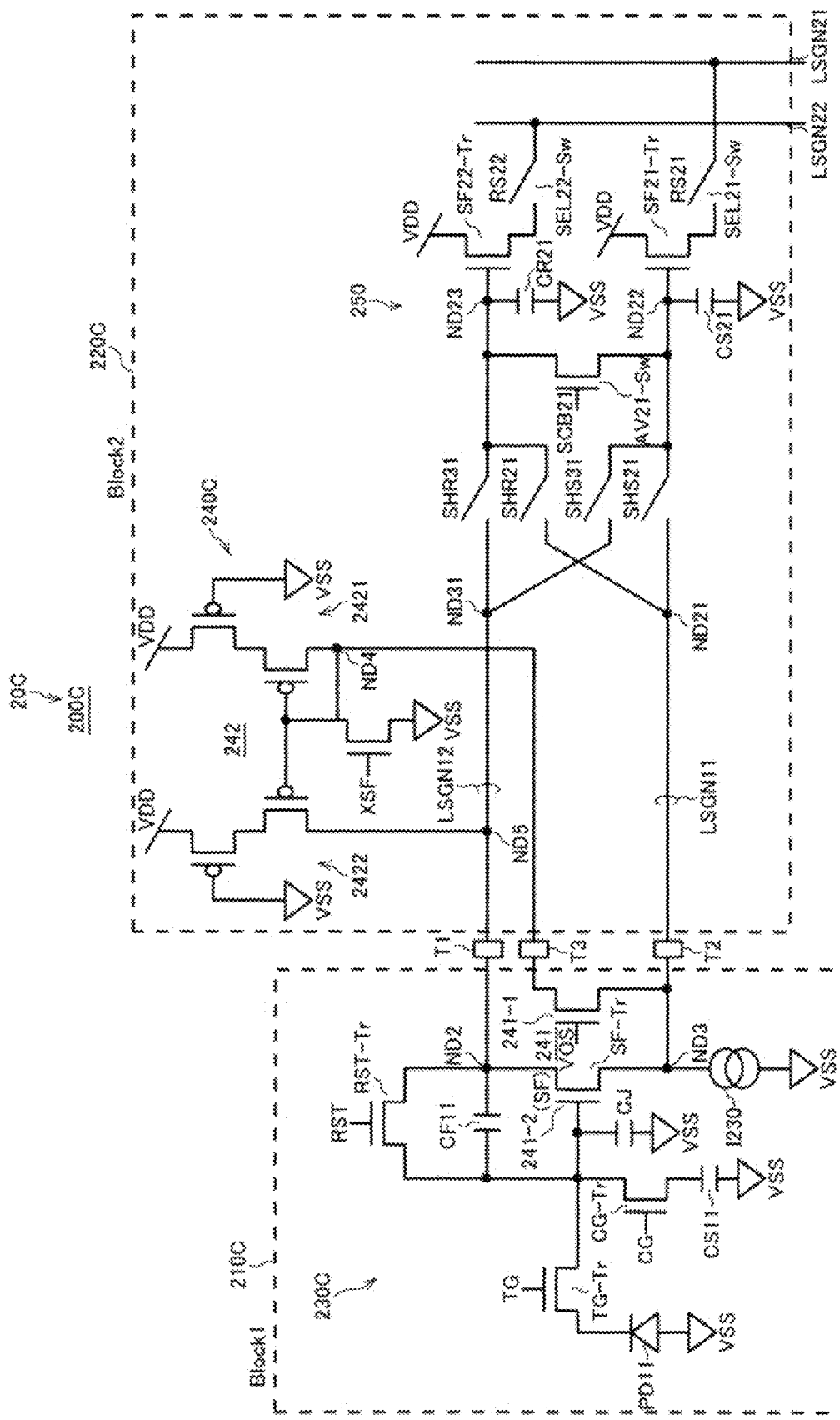
FIG. 10 shows an example configuration of a pixel according to a third embodiment of the present invention.

FIG. 10 shows an example configuration of a pixel according to a third embodiment of the present invention.

A pixel 200C of the third embodiment differs from the pixel 200 of the first embodiment in the following points. In the pixel 200C relating to the third embodiment, the first differential transistor 241-1 of the differential transistor pair 241 of the amplifier circuit 240 is formed not in the second block 220C, but in the first block 210C, which also includes the photoelectric conversion reading part 230.

According to the third embodiment, the connection node ND4 of the first load circuit 2421 of the amplifier circuit 240 in the second block 220C is connected via a connection terminal T3 to the drain of the first differential transistor 241-1 in the first block 210C. The source of the first differential transistor 241-1 in the first block 210C is connected to the reading node ND3, and the reading node ND3 is connected via a connection terminal T2 to the first in-pixel signal line LSGN11 in the second block 220C.

The third embodiment can not only produce the same effects as the above-described first embodiment but also achieve improved performance matching between the positive input and the negative input of the amplifier circuit 240C, thereby reducing the offset. The above configurations of the third embodiment can be applied to the above-described second embodiment.

Fourth Embodiment

Figure 11:
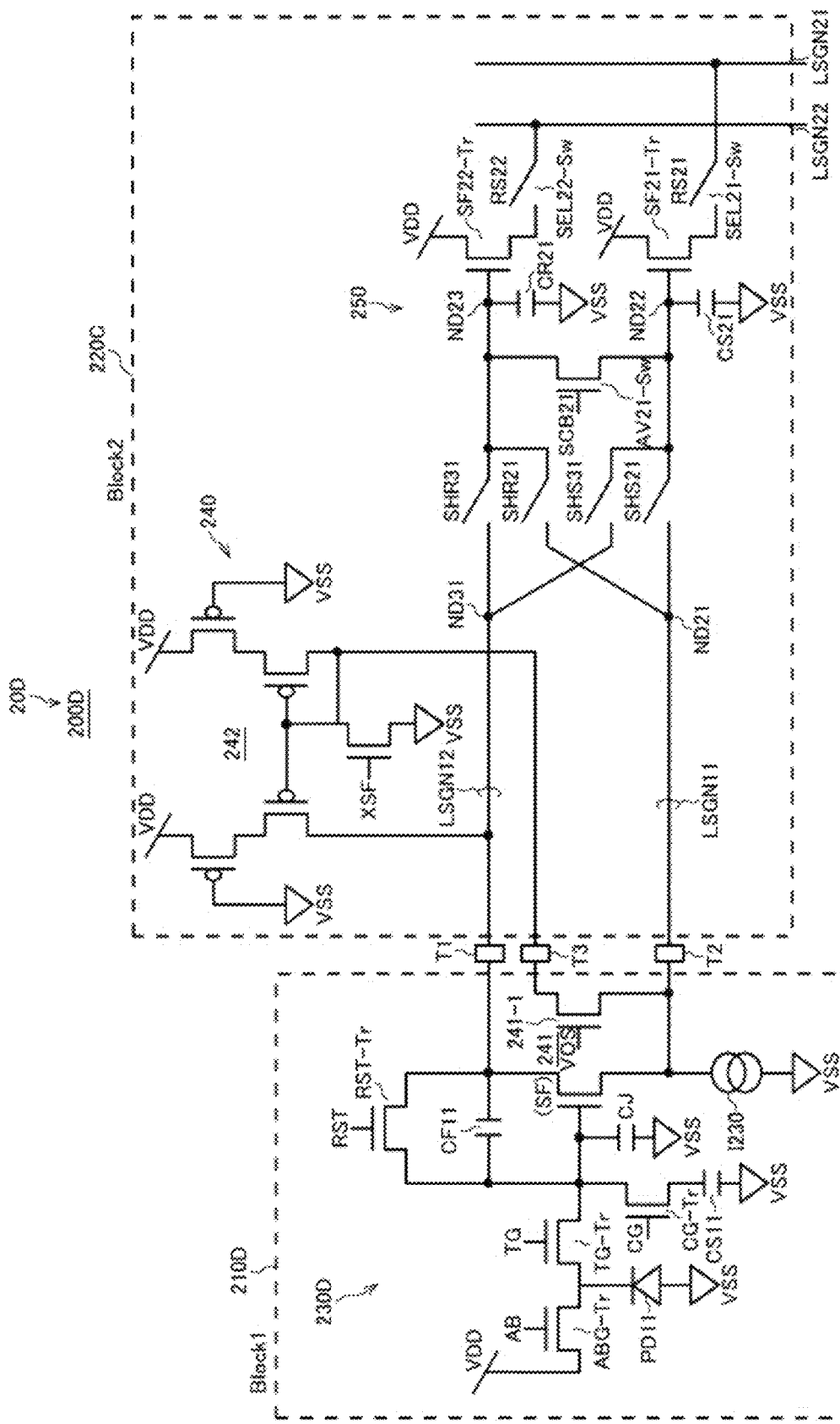
FIG. 11 shows an example configuration of a pixel according to a fourth embodiment of the present invention.

FIG. 11 shows an example configuration of a pixel according to a fourth embodiment of the present invention.

A pixel 200D of the fourth embodiment differs from the pixel 200C of the third embodiment in the following points. In the pixel 200D of the fourth embodiment, a photoelectric conversion reading part 230D includes an anti-blooming gate element ABG-Tr connected to the photodiode PD11.

The anti-blooming gate element ABG-Tr is configured to release the charges stored in the photodiode PD11.

For example, very intense light may be incident on the solid-state imaging device. In this case, electrons may overflow from the photodiode PD11 and flow into adjacent pixels, causing artifacts. The fourth embodiment can not only produce the same effects as the above-described third embodiment but also reduce the blooming. Since the off voltage is set substantially lower than the threshold voltage and slightly higher than 0V, a channel can be formed to allow the overflowing charges to flow into a region outside the photodiode PD11. In addition, the photodiode PD11 can be reset independently from the operation of the reading circuit.

The above configurations relating to the fourth embodiment can be applied to the above-described first, second and third embodiments.

Fifth Embodiment

Figure 12:
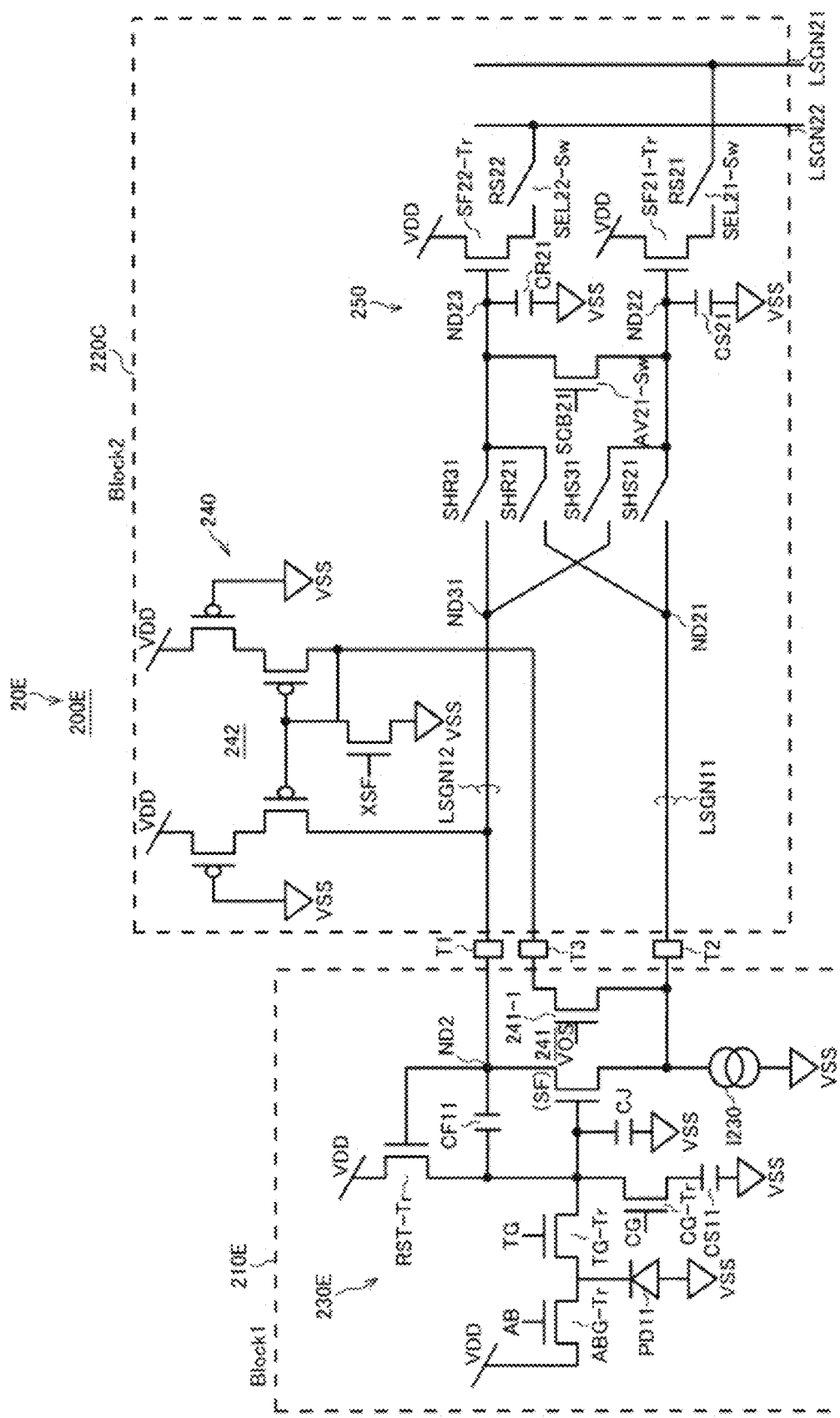
FIG. 12 shows an example configuration of a pixel according to a fifth embodiment of the present invention.

FIG. 12 shows an example configuration of a pixel according to a fifth embodiment of the present invention.

A pixel 200E of the fifth embodiment differs from the pixel 200D of the fourth embodiment in the following points. In a photoelectric conversion reading part 230E of the pixel 200E relating to the fifth embodiment, the source and drain of the reset transistor RST-Tr are connected between the power supply potential VDD and the floating diffusion FD11, and the gate of the reset transistor RST-Tr is connected to the connection node ND2.

According to the fifth embodiment, the source follower transistor SF-Tr is used for the signal reading, so that taper resetting can be performed at a low slew rate.

Sixth Embodiment

Figure 13:
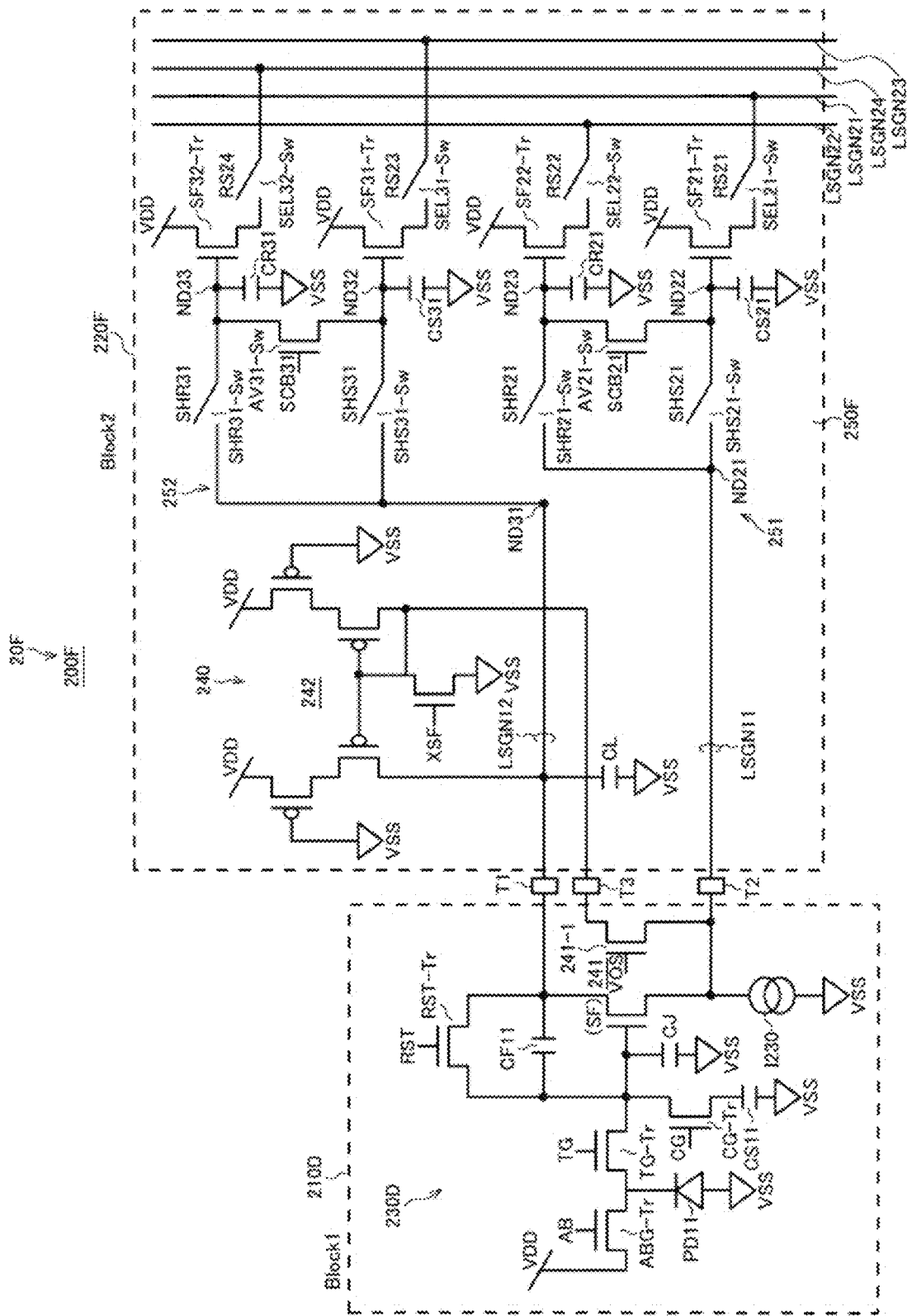
FIG. 13 shows an example configuration of a pixel according to a sixth embodiment of the present invention.
Figure 14:
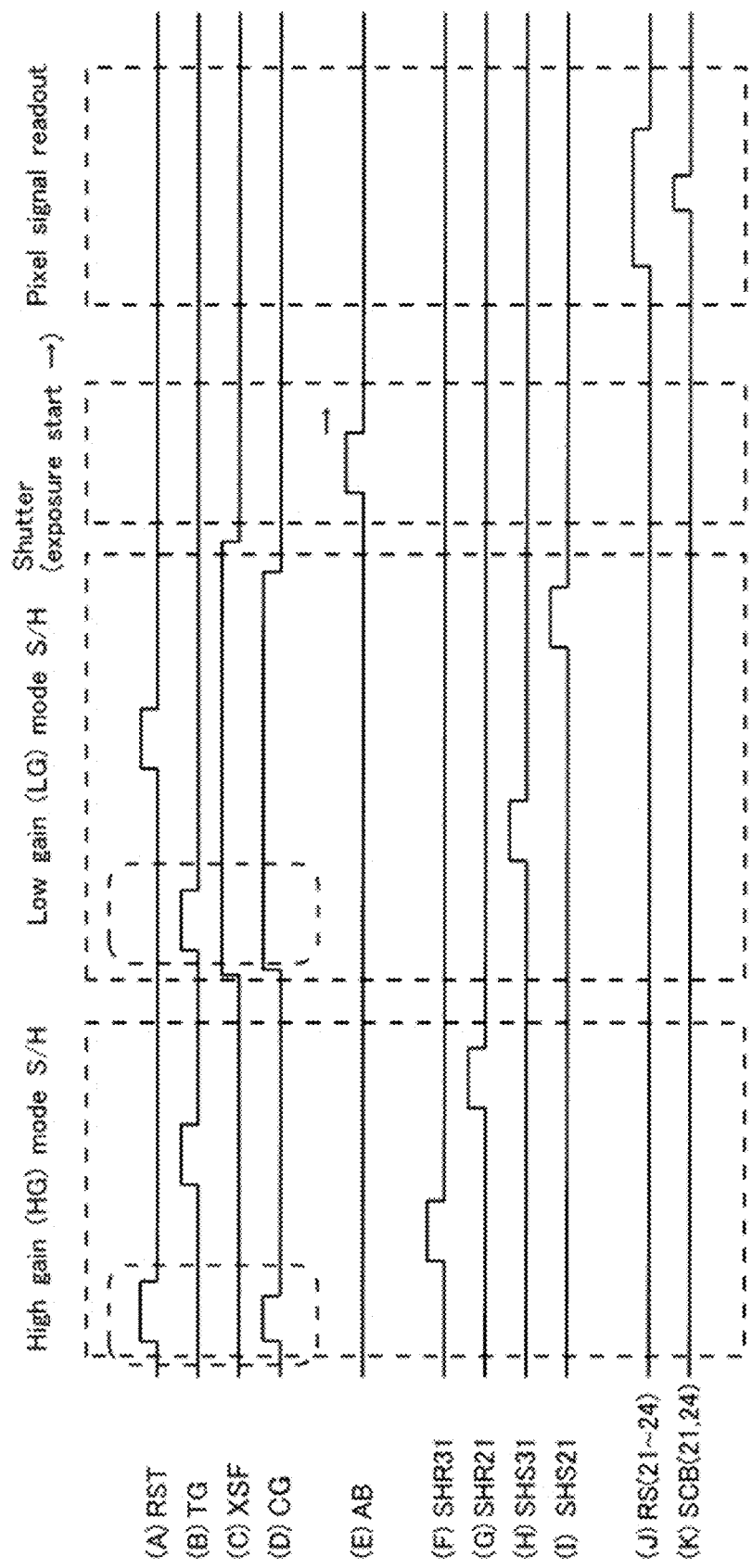
FIG. 14 is a timing chart to illustrate a reading operation performed by a pixel part in a solid-state imaging device relating to the sixth embodiment of the present invention.

FIG. 13 shows an example configuration of a pixel according to a sixth embodiment of the present invention. FIG. 14 is a timing chart including waveforms (A) to (K) to illustrate a reading operation performed by a pixel part in a solid-state imaging device relating to the sixth embodiment of the present invention.

In FIG. 14, the waveform (A) shows the control signal RST for the reset transistor RST-Tr of a photoelectric conversion reading part 230D of a pixel 200F. In FIG. 14, the waveform (B) shows the control signal TG for the transfer transistor TG-Tr of the photoelectric conversion reading part 230D of the pixel 200F. In FIG. 14, the waveform (C) shows the control signal XSF for the switching transistor SW-Tr of the reading circuit forming part 243 of the pixel 200F. In FIG. 14, the waveform (D) shows the control signal CG for the storage transistor CG-Tr of the photoelectric conversion reading part 230D of the pixel 200F. In FIG. 14, the waveform (E) shows the control signal AB for the anti-blooming gate element ABG-Tr of the photoelectric conversion reading part 230D of the pixel 200F. In FIG. 14, the waveform (F) shows the control signal SHR31 for the fourth sampling switch SHR31-Sw of the high-gain sampling circuit 252 of the signal holding part 250F. In FIG. 14, the waveform (G) shows the control signal SHR21 for the second sampling switch SHR21-Sw of the low-gain sampling circuit 251 of the signal holding part 250F. In FIG. 14, the waveform (H) shows the control signal SHS31 for the third sampling switch SHS31-Sw of the high-gain sampling circuit 252 of the signal holding part 250F. In FIG. 14, the waveform (I) shows the control signal SHS21 for the first sampling switch SHS21-Sw of the low-gain sampling circuit 251 of the signal holding part 250F. In FIG. 14, the waveform (J) shows the control signals RS21 to RS24 for the selection switches SEL21-Sw and SEL22-Sw of the signal holding part 250F of the pixel 200F. In FIG. 14, the waveform (K) shows the control signals SCB21 and SCB22 for the averaging switches AV21-Sw and AV22-Sw of the signal holding part 250F of the pixel 200F.

The solid-state imaging device 10F relating to the sixth embodiment differs from the solid-state imaging device 10 relating to the first embodiment in the following points. In the solid-state imaging device 10 relating to the first embodiment, the signals are independently read in the low- and high-gain read-out modes MLG and MHG, in other words, signals corresponding to the charges stored in the photodiode PD11 under different conditions are read. In the solid-state imaging device 10F relating to the sixth embodiment, on the other hand, signals are sequentially read, in other words, signals corresponding to the charges stored in the photodiode PD11 under the same conditions are read. Specifically speaking, in the solid-state imaging device 10F relating to the sixth embodiment, the photoelectric conversion reading part 230D is configured such that outputting the low-gain read-out voltage N1 (VRST1, VSIG1) to the first in-pixel signal line LSGN11 takes place concurrently and in parallel with outputting the high-gain readout voltage N2 (VRST2, VSIG2) to the second in-pixel signal line LSGN12.

The following describes the input/output transmission characteristics of the pixel 200F of the solid-state imaging device 10F relating to the sixth embodiment and how to set the high- and low-gain output ranges.

<Input/Output Transmission Characteristics of Pixel 200F>

The following first describes the input/output transmission characteristics of the pixel 200F relating to the sixth embodiment of the present invention.

Figure 15:
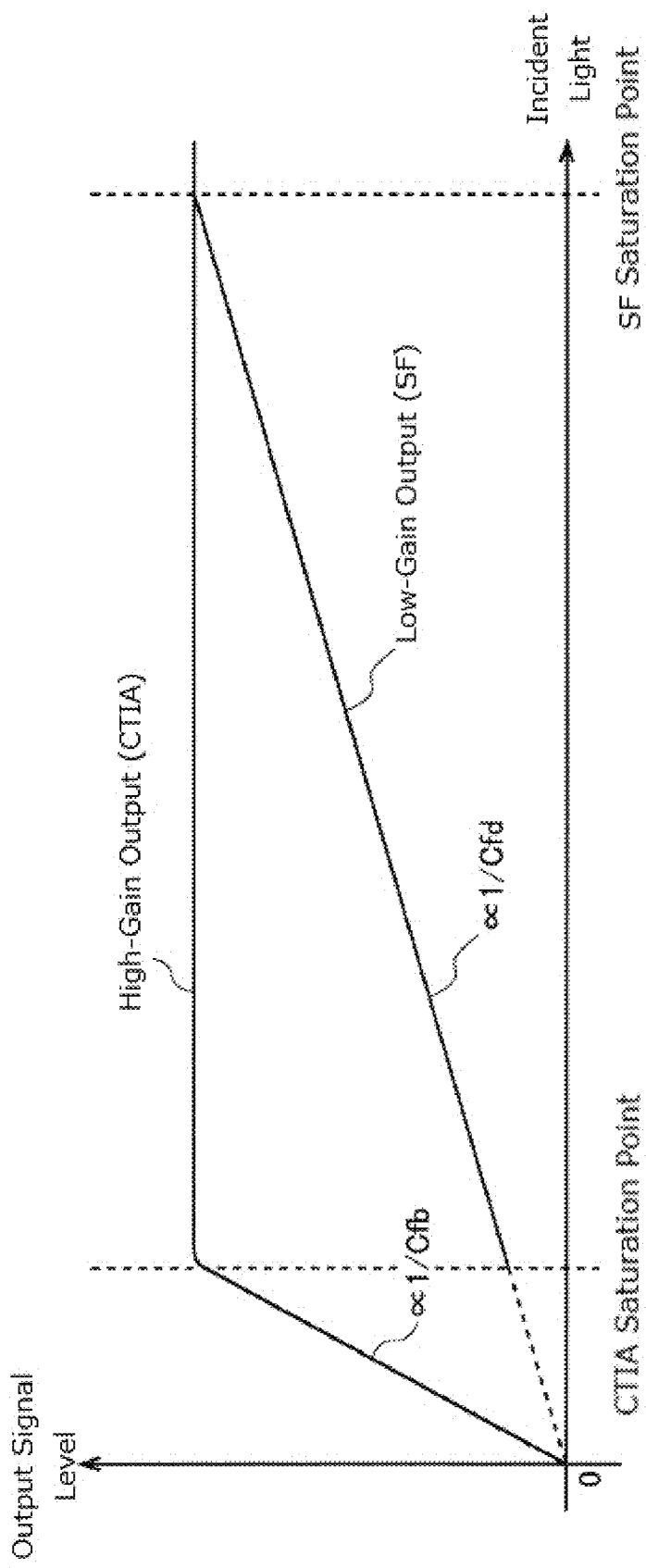
FIG. 15 is used to illustrate input/output transmission characteristics of the pixel relating to the sixth embodiment of the present invention.

FIG. 15 is used to illustrate input/output transmission characteristics of the pixel relating to the sixth embodiment of the present invention. In FIG. 15, the horizontal axis represents the amount of incident light, and the vertical axis represents the output signal level.

As is clear from the input/output transmission characteristics of the pixel shown in FIG. 15, the high-gain CTIA circuit mainly operates in the low-luminance domain where the amount of incident light is low. The CTIA output reaches saturation at the CTIA saturation point, which automatically starts the source follower transistor SF-Tr (SF circuit) serving as the low-gain amplifier in the pixel. While the CTIA and SF output signal levels are set at the same level in the drawing, they may be different from each other in the present embodiment.

The non-linearity can be reduced at the CTIA saturation start point by raising the DC gain of the error amplifier constituting the amplifier circuit 240, for example.

<How to Set High- and Low-Gain Output Ranges>

The following now describes how to set the high- and low-gain output ranges in the sixth embodiment of the present invention.

Figure 16:
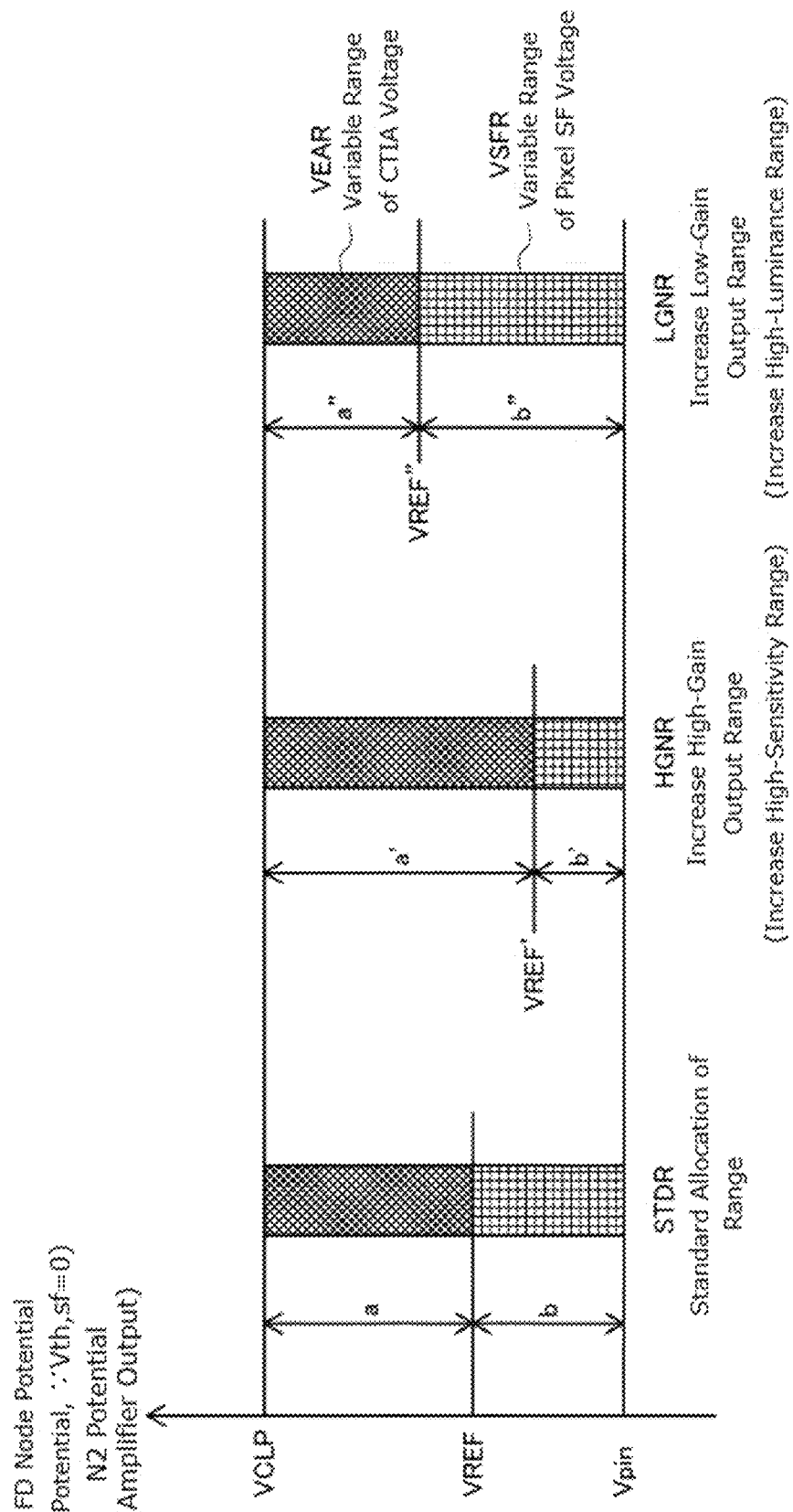
FIG. 16 is used to illustrate how to set the ranges of the high- and low-gain outputs in the sixth embodiment of the present invention.

FIG. 16 is used to illustrate how to set the high- and low-gain output ranges in the sixth embodiment of the present invention. In FIG. 16, the horizontal axis shows different cases respectively corresponding to the standard condition STDR, the high-gain preferred condition HGNR and the low-gain preferred condition LGNR. The vertical axis represents the voltage output range for the source follower (SF) amplifier in the pixel (the threshold is set at 0V) VSFR and the voltage output range for the error amplifier VEAR. In FIG. 16, VCLP, VREF and Vpin respectively represent the clip voltage at which the output of the error amplifier is clipped, the reference voltage of the error amplifier when the unity gain buffer is constituted, and the pinning voltage of the photodiode PD11 (the minimum voltage at which the charges can be fully transferred from the PD11).

As shown in FIG. 16, the reference voltage VREF is set slightly lower than the middle value between the clipping voltage VCLP and the pinning voltage Vpin (or at the middle value) if a standard combination of the high- and low-gain outputs is desired.

If the high-gain output is more required, the reference voltage VREF' is set closer to the pinning voltage Vpin (such that the relation of a'/(a'+b')>a/(a+b) is satisfied). Although the dynamic range is reduced, the S/N can be kept high.

If the low-gain output is more required, the reference voltage VREF" is set closer to the clipping voltage VCLP (such that the relation of a"/(a"+b")<a/(a+b) is satisfied). This can lead to increased dynamic range.

The reference voltage VREF may be adjusted based on the photon shot noise and the noise floor of the reading circuit including the ADC. Thus, optimization to improve the more practical SNR10 index can be achieved simply by adjusting the voltage. The conventional LOFIC pixels encounter difficulties in independently changing the high- and low-gain ranges.

According to the present invention, the high- and low-gain output ranges can be dynamically set.

Figure 17:
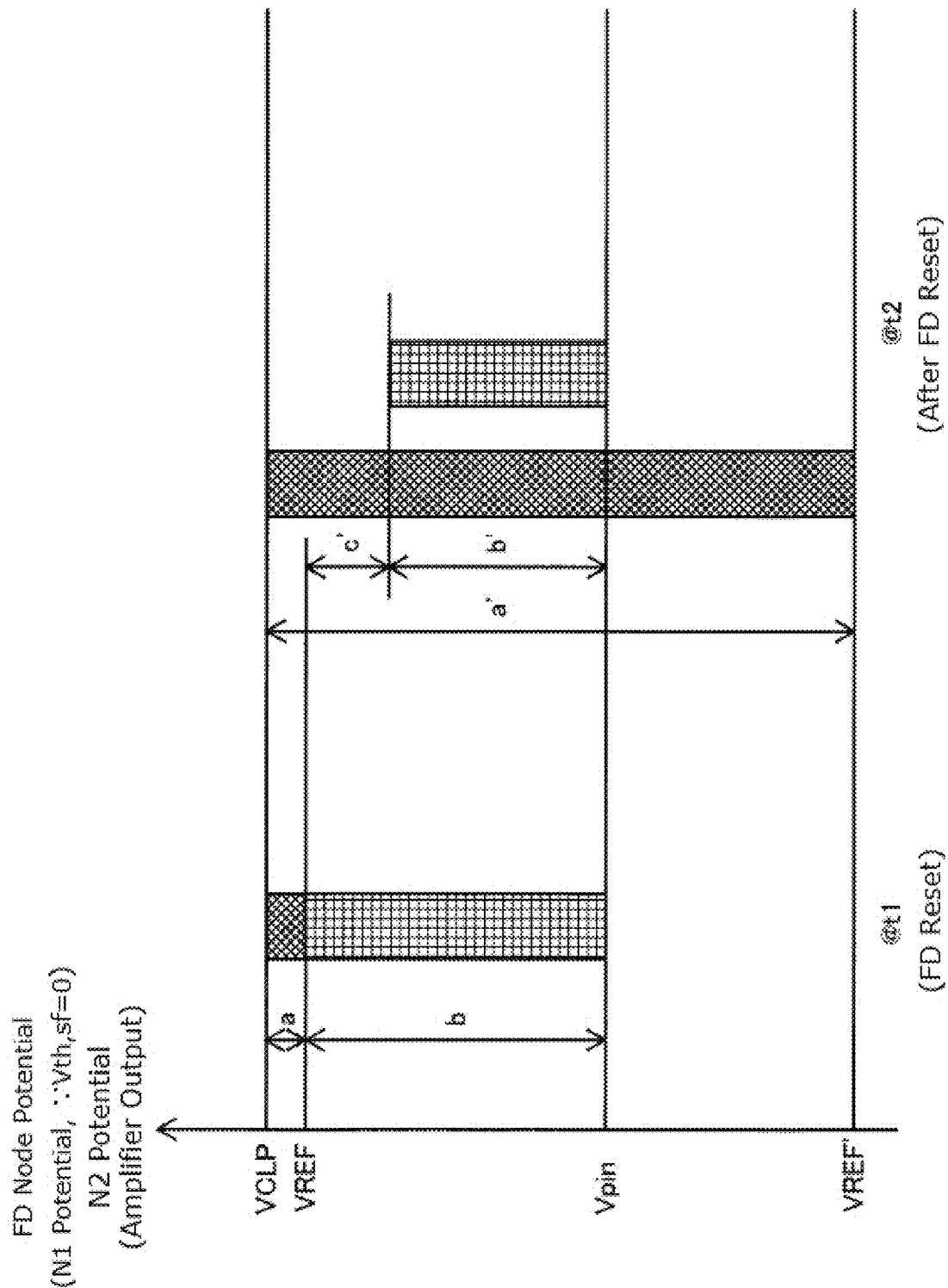
FIG. 17 is used to illustrate how to dynamically set the ranges of the high- and low-gain outputs in the sixth embodiment of the present invention.

FIG. 17 is used to illustrate how to dynamically set the high- and low-gain output ranges in the first embodiment of the present invention. During the resetting of the floating diffusion FD11, the reference voltage VREF is set approximately equal to the clipping voltage VCLP (such that the relation of a/(a+b)<<b/(a+b) is satisfied) in order to maximize the low-gain voltage output. After completion of the resetting of the floating diffusion FD11, the reference voltage VREF is lowered by ΔVREF. This causes a difference in potential between the input terminals of the error amplifier, and the output of the error amplifier drops to cancel the difference in potential. Due to the capacitive negative feedback, the final error amplifier output VREF' is settled at a level lower than the reference voltage VREF by ΔVREF/feedback rate β(Cfb11/(Cfb11+Cfd11)). Since the error amplifier output VREF' can be set substantially lower than the pinning voltage Vpin, the pixels 200 can achieve a wider range for the high-gain voltage than the conventional LOFIC pixels (such that the relation of a'>>a can be satisfied). Although the FD node voltage may be lowered by an amount expressed as (VREF-VREF')×feedback rate β(Cfb11/(Cfb11+Cfd11)), i.e., ΔVREF, the loss is only approximately 0.25V under the assumption that 13 is 0.125 and (VREF-VREF') is 2V (c'/(b'+c')<<b'/(b'+c')). The variable range for the pixel SF voltage VSFR can be increased compared with the case where the low-gain output range is increased (LGNR shown in FIG. 16). Thus, the present invention can be effectively applied when it is desired to increase both of the high- and low-gain voltage ranges without a trade-off or to achieve sufficient high- and low-gain voltage ranges without a trade-off even if the clipping voltage VCLP and/or power supply voltage is lowered.

The high-gain read-out mode MHG in the photoelectric conversion reading part 230D of the pixel 200F described above is now illustrated. If the charges from the photodiode PD11 are not much, the charges are all transferred to the feedback capacitor CF11 having the capacitance Cfb11 due to the miller effect produced by the CTIA circuit, so that the high gain is applied for the amplification and the output voltage N2 (VRST2, VSIG2) can be resultantly produced. In the low-gain read-out mode MLG, on the other hand, the CTIA circuit may reach saturation and the miller effect may automatically diminish. Accordingly, the remaining part of the overflowing charges move to the floating diffusion FD11, which has the large capacitance Cfd11, so that the low gain is applied for the amplification and the output voltage N1 (VRST1, VSIG1) can be resultantly produced.

In the solid-state imaging device 10F relating to the sixth embodiment, the low-gain read-out voltage N1 (VRST1, VSIG1) output to the first in-pixel signal line LSGN11 and the high-gain readout voltage N2 (VRST2, VSIG2) output to the second in-pixel signal line LSGN12 are sampled by the low- and high-gain sampling circuits, which are different signal memories, as is done in the example shown in FIG. 3. The signal holding part 250F of the solid-state imaging device 10F can simultaneously sample the high- and low-gain signal voltages N1 and N2.

In the solid-state imaging device 10F, the signals are read in the following manner.

(1) The read-out signal level in the high-gain read-out mode MHG is referred to in order to select the high-gain read-out voltage N2 (VRST2, VSIG2) or the low-gain read-out voltage N1 (VRST1, VSIG1), which has been sampled and stored.

(2) The read-out voltage N2 (VRST2, VSIG2), i.e., the read-out signals in the high-gain read-out mode MHG, are sampled and read, and the read-out voltage N1 (VRST1, VSIG1), i.e., the low-gain read-out mode MLG signals, are sampled and read.

In the solid-state imaging device 10F relating to the sixth embodiment, as shown in the waveforms (D), (F) and (G) shown in FIG. 14, the control signal CG remains at the high level for a predetermined period of time before the read-out voltage N2 (VRST2, VSIG2), i.e., the read-out signals in the high-gain read-out mode MHG, are sampled and held, so that the storage node of the storage capacitor CS11 is initialized via the reset transistor RST-Tr and storage transistor CG-Tr. In the solid-state imaging device 10F relating to the sixth embodiment, as shown in the waveforms (B), (H) and (I) shown in FIG. 14, the control signal TG again remains at the high level for a predetermined period of time in order to eliminate the remaining charges in the photodiode PD11, before the read-out voltage N1 (VRST1, VSIG1), i.e., the read-out signals in the low-gain read-out mode MLG, are sampled and held, so that a second transfer operation is performed.

The read-out voltage N1 (VRST1, VSIG1), i.e., the read-out signals in the low-gain read-out mode MLG, are sampled and held in a so-called 3-transistor operational mode. In this case, although the kTC noise affects the read-out noise floor, the photon shot noise at the noise signal conjunction point may possibly perform screening.

The sixth embodiment can produce the same effects as the above-described first embodiment but also produce the following effects. Specifically, the solid-state imaging device 10F relating to the sixth embodiment is configured such that the signal voltage is amplified with two gains, i.e., the high and low gains and the resulting signal voltages are read simultaneously and in parallel, the high- and low-gain signal voltages can be sampled simultaneously and in parallel. Accordingly, a low-luminance signal can be read with a high gain, a high-luminance signal can be read with a low gain to avoid saturation, and the high- and low-gain signals can be obtained in only two rounds of read-out.

The solid-state imaging devices 10, 10B to 10F described above can be applied, as imaging devices, to electronic apparatuses such as digital cameras, video cameras, mobile terminals, surveillance cameras, and medical endoscope cameras.

Figure 18:
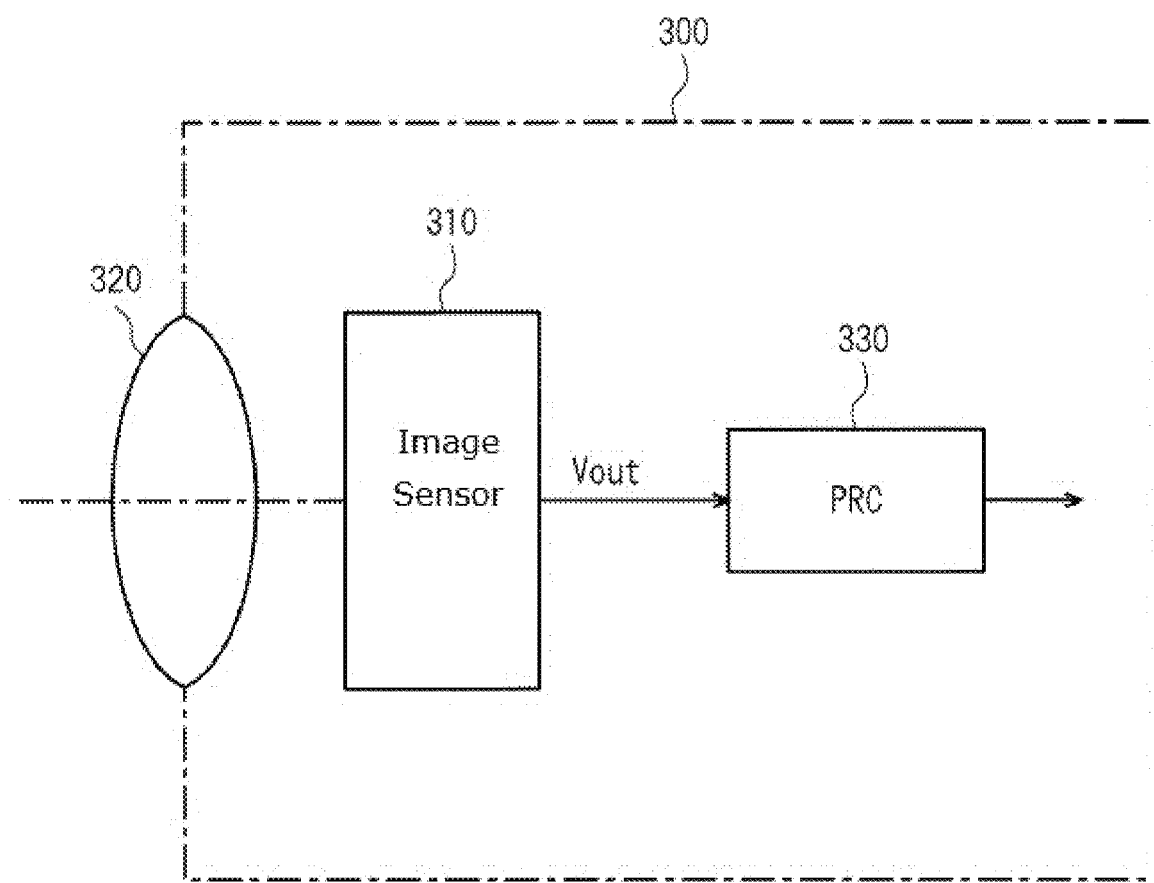
FIG. 18 shows an example configuration of an electronic apparatus to which the solid-state imaging devices relating to the embodiments of the present invention can be applied.

FIG. 18 shows an example configuration of an electronic apparatus including a camera system to which the solid-state imaging devices according to the embodiments of the present invention can be applied.

As shown in FIG. 18, the electronic apparatus 300 includes a CMOS image sensor 310 that can be constituted by any of the solid-state imaging devices 10, 10B to 10F relating to the embodiments of the present invention. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes any one of the solid-state imaging devices 10, 10B to 10F as the CMOS image sensor 310. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising
   a pixel part having a plurality of pixels arranged therein, wherein each of the pixels includes:
   a photoelectric conversion reading part for storing charges produced by photoelectric conversion and producing a readable voltage signal at a level determined by an amount of the stored charges;
   an amplifier circuit for amplifying a read-out voltage signal read from the photoelectric conversion reading part;
   a signal holding part including a sample-and-hold signal holding capacitor for holding the read-out voltage signal amplified by the amplifier circuit and outputting the held voltage signal;
   a first in-pixel signal line to which a low-gain read-out voltage signal is output; and
   a second in-pixel signal line connected to an output side of the amplifier circuit and to which a high-gain read-out voltage signal is output,
   wherein the photoelectric conversion reading part includes:
   a photoelectric conversion element for storing therein, in an integration period, charges generated by photoelectric conversion;
   a transfer element for transferring, in a transfer period, the charges stored in the photoelectric conversion element;
   an output node to which the charges stored in the photoelectric conversion element are transferred through the transfer element;
   a source follower transistor for converting the charges in the output node into a voltage signal at a level corresponding to an amount of the charges;
   a reset element for resetting, in a reset period, the output node to a predetermined potential or to a potential of the second in-pixel signal line; and
   a feedback capacitor having electrodes one of which is connected to the output node and the other of which is connected to the second in-pixel signal line,
   wherein the first in-pixel signal line is:
   connected to an output line to which the voltage signal is output from the source follower transistor; and
   connected to an input side of the amplifier circuit,
   wherein the amplifier circuit includes
   a differential transistor pair constituted by first and second differential transistors with a reference signal being fed to a gate of the first differential transistor, the differential transistor pair being configured to perform differential amplification, and
   wherein the second differential transistor of the differential transistor pair also serves as the source follower transistor.

2. The solid-state imaging device of claim 1, wherein, in response to a control signal, the amplifier circuit:
   in a low-gain read-out mode, outputs a read-out voltage signal amplified with a low gain through source follower amplification by the source follower transistor to the first in-pixel signal line; and
   in a high-gain read-out mode, uses a miller effect produced by a capacitive trans-impedance amplifier (CTIA) circuit including the feedback capacitor and the differential transistor pair of the amplifier circuit to transfer charges to the feedback capacitor and outputs a voltage signal amplified with a high gain to the second in-pixel signal line.

3. The solid-state imaging device of claim 2, wherein the amplifier circuit includes:
   an active load circuit constituted by a first load circuit connected to a drain side of the first differential transistor and a second load circuit connected to a drain side of the second differential transistor, the first and second load circuits being connected to form a current mirror providing a current channel from the drain side of the first differential transistor to the drain side of the second differential transistor; and
   a reading circuit forming part for, in response to the control signal, deactivating the first load circuit in the low-gain read-out mode to form a low-gain read-out circuit by the second load circuit and the source follower transistor and activating the first load circuit in the high-gain read-out mode to form a high-gain read-out circuit by the capacitive trans-impedance amplifier (CTIA) circuit including the feedback capacitor and the differential transistor pair of the amplifier circuit.

4. The solid-state imaging device of claim 3,
   wherein the first load circuit includes a first load transistor having a gate and a drain connected to the drain side of the first differential transistor,
   wherein the second load circuit includes a second load transistor having a drain connected to the drain side of the source follower transistor serving as the second differential transistor and also having a gate connected to the gate and drain of the first load transistor, and
   wherein the reading circuit forming part includes an activation control circuit for, in the low-gain read-out mode, connecting the gate of the first load transistor to a predetermined potential that is sufficient to keep the first load transistor in a conduction state and connecting the gate and drain of the first load transistor to the predetermined potential to deactivate the first load transistor.

5. The solid-state imaging device of claim 3, wherein, in the low-gain read-out mode, the reference signal is fed to the gate of the first differential transistor at such a level that the first differential transistor remains in a non-conduction state.

6. The solid-state imaging device of claim 1, comprising:
a storage transistor connected to the output node; and
a capacitor element for exchanging charges at least with the output node via the storage transistor.

7. The solid-state imaging device of claim 1, wherein the signal holding part includes:
a low-gain sampling circuit connected to the first in-pixel signal line, the low-gain sampling circuit being configured to sample the low-gain read-out voltage signal read onto the first in-pixel signal line; and
a high-gain sampling circuit configured to sample the high-gain read-out voltage signal read onto the second in-pixel signal line.

8. The solid-state imaging device of claim 7,
wherein the low-gain sampling circuit includes:
a first signal holding capacitor for holding a first read-out voltage signal corresponding to the charges stored at the photoelectric conversion element, the first read-out voltage signal being input into a first input node via the first in-pixel signal line;
a first switch element for selectively connecting the first signal holding capacitor to the first in-pixel signal line;
a first output part for selectively outputting, to a first signal line, the signal held in the first signal holding capacitor at a level corresponding to held voltage;
a second signal holding capacitor for holding a first read-out reset voltage signal corresponding to a reset state, the first read-out reset voltage signal being input into the first input node via the first in-pixel signal line;
a second switch element for selectively connecting the second signal holding capacitor to the first in-pixel signal line; and
a second output part for selectively outputting, to a second signal line, the signal held in the second signal holding capacitor at a level corresponding to held voltage, and
wherein the high-gain sampling circuit includes:
a third signal holding capacitor for holding a second read-out voltage signal corresponding to the charges stored at the photoelectric conversion element, the second read-out voltage signal being input into a second input node via the second in-pixel signal line;
a third switch element for selectively connecting the third signal holding capacitor to the second in-pixel signal line;
a third output part for selectively outputting, to the first signal line, the signal held in the third signal holding capacitor at a level corresponding to held voltage;
a fourth signal holding capacitor for holding a second read-out reset voltage signal corresponding to a reset state, the second read-out reset voltage signal being input into the fourth input node via the second in-pixel signal line;
a fourth switch element for selectively connecting the fourth signal holding capacitor to the second in-pixel signal line; and
a fourth output part for selectively outputting, to the second signal line, the signal held in the fourth signal holding capacitor at a level corresponding to held voltage.

9. The solid-state imaging device of claim 8,
wherein the low-gain sampling circuit of the signal holding part includes a first averaging part for selectively averaging the signal held in the first signal holding capacitor or the signal held in the second signal holding capacitor, and
wherein the high-gain sampling circuit of the signal holding part includes a second averaging part for selectively averaging the signal held in the third signal holding capacitor or the signal held in the fourth signal holding capacitor.

10. The solid-state imaging device of claim 9,
wherein a first common signal holding capacitor is provided to serve as the first signal holding capacitor of the low-gain sampling circuit and the third signal holding capacitor of the high-gain sampling circuit and connected to a first holding node,
wherein a second common signal holding capacitor is provided to serve as the second signal holding capacitor of the low-gain sampling circuit and the fourth signal holding capacitor of the high-gain sampling circuit and connected to a second holding node,
wherein a first common output part is provided to serve as the first output part of the low-gain sampling circuit and the third output part of the high-gain sampling circuit to output a signal at a level determined by voltage held in the first holding node to the first signal line,
wherein a second common output part is provided to serve as the second output part of the low-gain sampling circuit and the fourth output part of the high-gain sampling circuit to output a signal at a level determined by voltage held in the second holding node to the second signal line,
wherein a common averaging part is provided to serve as the first averaging part of the low-gain sampling circuit and the second averaging part of the high-gain sampling circuit and selectively averages the voltage held in the first holding node or the voltage held in the second holding node,
wherein the first switch element is connected between the first holding node and the first input node connected to the first in-pixel signal line,
wherein the second switch element is connected between the second holding node and the first input node connected to the first in-pixel signal line,
wherein the third switch element is connected between the first holding node and the second input node connected to the second in-pixel signal line, and
wherein the fourth switch element is connected between the second node and the second input node connected to the second in-pixel signal line.

11. The solid-state imaging device of claim 1, wherein, in the photoelectric conversion reading part, a charge compensation capacitor is connected to a connection feedback node between a floating diffusion serving as the output node and the feedback capacitor, in order to compensate for charges injected from a reset transistor serving as the reset element after resetting.

12. The solid-state imaging device of claim 11, wherein a charge injection pulse is applied to the charge compensation capacitor.

13. The solid-state imaging device of claim 12, wherein the charge injection pulse is:
applied at a first voltage in a high-gain read-out mode; and
applied at a second voltage higher than the first voltage in a low-gain read-out mode.

14. The solid-state imaging device of claim 1, wherein the photoelectric conversion reading part includes
an anti-blooming gate element connected to the photoelectric conversion element, the anti-blooming gate being configured to release the charges stored in the photoelectric conversion element.

15. The solid-state imaging device according to claim 1, wherein the reset element is connected between (i) the output node and (ii) a connection node between the feedback capacitor and the second in-pixel signal line, and
wherein a gate of the reset element is connected to a feeding line of a control signal for resetting.

16. The solid-state imaging device of claim 1,
wherein the reset element is connected between the output node and a predetermined potential, and
wherein a gate of the reset element is connected to a connection node between the feedback capacitor and the second in-pixel signal line.

17. The solid-state imaging device of claim 1, comprising:
a first block; and
a second block connected to the first block via a connection part,
wherein the first block has
at least the photoelectric conversion reading part of the each pixel formed therein, and
wherein the second block has
at least an active load circuit of the amplifier circuit, the signal holding part, the first in-pixel signal line, the second in-pixel signal line, the first signal line and the second signal line of the each pixel formed therein.

18. The solid-state imaging device of claim 17, wherein the first differential transistor of the amplifier circuit is formed in the first block.

19. A method for driving a solid-state imaging device, the solid-state imaging device including
a pixel part having a plurality of pixels arranged therein, wherein each of the pixels includes:
a photoelectric conversion reading part for storing charges produced by photoelectric conversion and producing a readable voltage signal at a level determined by an amount of the stored charges;
an amplifier circuit for amplifying a read-out voltage signal read from the photoelectric conversion reading part;
a signal holding part including a sample-and-hold signal holding capacitor for holding the read-out voltage signal amplified by the amplifier circuit and outputting the held voltage signal;
a first in-pixel signal line to which a low-gain read-out voltage signal is output; and
a second in-pixel signal line connected to an output side of the amplifier circuit and to which a high-gain read-out voltage signal is output,
wherein the photoelectric conversion reading part includes:
a photoelectric conversion element for storing therein, in an integration period, charges generated by photoelectric conversion;
a transfer element for transferring, in a transfer period, the charges stored in the photoelectric conversion element;
an output node to which the charges stored in the photoelectric conversion element are transferred through the transfer element;
a source follower transistor for converting the charges in the output node into a voltage signal at a level corresponding to an amount of the charges;
a reset element for resetting, in a reset period, the output node to a predetermined potential or to a potential of the second in-pixel signal line; and
a feedback capacitor having electrodes one of which is connected to the output node and the other of which is connected to the second in-pixel signal line,
wherein the first in-pixel signal line is:
connected to an output line to which the voltage signal is output from the source follower transistor; and
connected to an input side of the amplifier circuit,
wherein the amplifier circuit includes:
a differential transistor pair constituted by first and second differential transistors with a reference signal being fed to a gate of the first differential transistor, the differential transistor pair being configured to perform differential amplification; and
an active load circuit constituted by a first load circuit connected to a drain side of the first differential transistor and a second load circuit connected to a drain side of the second differential transistor, the first and second load circuits being connected to form a current mirror providing a current channel from the drain side of the first differential transistor to the drain side of the second differential transistor,
wherein the second differential transistor of the differential transistor pair also serves as the source follower transistor,
wherein, in a low-gain read-out mode, the first load circuit is deactivated to form a low-gain read-out circuit by the second load circuit and the source follower transistor, and a read-out voltage signal amplified with a low gain through source follower amplification by the source follower transistor is output to the first in-pixel signal line, and, in a high-gain read-out mode, the first load circuit is activated to form a high-gain read-out circuit by a capacitive trans-impedance amplifier (CTIA) circuit including the feedback capacitor and the differential transistor pair of the amplifier circuit, and a miller effect produced by the capacitive trans-impedance amplifier (CTIA) circuit including the feedback capacitor and the differential transistor pair of the amplifier circuit is used to transfer charges to the feedback capacitor and a voltage signal amplified with a high gain is output to the second in-pixel signal line.

20. An electronic apparatus comprising:
a solid-state imaging device; and
an optical system for forming a subject image on the solid-state imaging device,
wherein the solid-state imaging device includes
a pixel part having a plurality of pixels arranged therein, wherein each of the pixels includes:
a photoelectric conversion reading part for storing charges produced by photoelectric conversion and producing a readable voltage signal at a level determined by an amount of the stored charges;
an amplifier circuit for amplifying a read-out voltage signal read from the photoelectric conversion reading part;
a signal holding part including a sample-and-hold signal holding capacitor for holding the read-out voltage signal amplified by the amplifier circuit and outputting the held voltage signal;
a first in-pixel signal line to which a low-gain read-out voltage signal is output; and
a second in-pixel signal line connected to an output side of the amplifier circuit and to which a high-gain read-out voltage signal is output, wherein the photoelectric conversion reading part includes:

a photoelectric conversion element for storing therein, in an integration period, charges generated by photoelectric conversion;

a transfer element for transferring, in a transfer period, the charges stored in the photoelectric conversion element;

an output node to which the charges stored in the photoelectric conversion element are transferred through the transfer element;

a source follower transistor for converting the charges in the output node into a voltage signal at a level corresponding to an amount of the charges;

a reset element for resetting, in a reset period, the output node to a predetermined potential or to a potential of the second in-pixel signal line; and a feedback capacitor having electrodes one of which is connected to the output node and the other of which is connected to the second in-pixel signal line, wherein the first in-pixel signal line is:

connected to an output line to which the voltage signal is output from the source follower transistor; and connected to an input side of the amplifier circuit, wherein the amplifier circuit includes a differential transistor pair constituted by first and second differential transistors with a reference signal being fed to a gate of the first differential transistor, the differential transistor pair being configured to perform differential amplification, and wherein the second differential transistor of the differential transistor pair also serves as the source follower transistor.

* * * * *